United States Patent
Hamada et al.

(10) Patent No.: US 11,849,324 B2
(45) Date of Patent: Dec. 19, 2023

(54) DETECTION DEVICE, VEHICLE, DETECTION METHOD, AND DETECTION PROGRAM

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Yoshihiro Hamada, Osaka (JP); Hiroshi Ueda, Yokkaichi (JP); Naoki Adachi, Yokkaichi (JP); Shinichi Aiba, Yokkaichi (JP); Shogo Kamiguchi, Yokkaichi (JP); Fumiya Ishikawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 20 days.

(21) Appl. No.: 17/622,122

(22) PCT Filed: May 19, 2020

(86) PCT No.: PCT/JP2020/019704
§ 371 (c)(1),
(2) Date: Dec. 22, 2021

(87) PCT Pub. No.: WO2021/065068
PCT Pub. Date: Apr. 8, 2021

(65) Prior Publication Data
US 2022/0264303 A1 Aug. 18, 2022

(30) Foreign Application Priority Data
Sep. 30, 2019 (JP) .................................. 2019-178177

(51) Int. Cl.
*H04L 29/06* (2006.01)
*H04W 12/106* (2021.01)
(Continued)

(52) U.S. Cl.
CPC ........... *H04W 12/106* (2021.01); *H04W 4/48* (2018.02); *H04W 12/121* (2021.01)

(58) Field of Classification Search
CPC .......................... H04W 12/106; H04W 12/121
See application file for complete search history.

(56) References Cited

U.S. PATENT DOCUMENTS 11,575,538 B2  2/2023  Takahashi et al.
2010/0118721 A1  5/2010  Sakurada et al.
(Continued)

FOREIGN PATENT DOCUMENTS

CN  101636972 A  1/2010
JP  2014-146868 A  8/2014
(Continued)

OTHER PUBLICATIONS

The U.S. Appl. No. 17/622,086, filed Dec. 22, 2021 in the name of Yoshihiro Hamada et al.
(Continued)

*Primary Examiner* — Jeffrey C Pwu
*Assistant Examiner* — Thong P Truong
(74) *Attorney, Agent, or Firm* — Oliff PLC

(57) ABSTRACT

A detection device includes: a monitoring unit configured to monitor, as target messages, an authorized message being periodically transmitted and the unauthorized message in the in-vehicle network; and a generation unit configured to
(Continued)

generate a reference time to be used in a detection process of detecting the unauthorized message; a detection unit configured to perform detection process, based on time difference between a time corresponding to a transmission time of target message based on a monitoring result of the monitoring unit, and the reference time generated by the generation unit. When target message has been determined to be abnormal in the detection process, the generation unit, based on a value obtained by adding a latest statistical value to the reference time, generates a new reference time to be used in the detection process for a target message to be transmitted after the target message having been determined to be abnormal.

7 Claims, 16 Drawing Sheets

(51) Int. Cl.
  *H04W 4/48* (2018.01)
  *H04W 12/121* (2021.01)

(56) References Cited

U.S. PATENT DOCUMENTS

| | | |
|---|---|---|
| 2015/0358351 A1 | 12/2015 | Otsuka et al. |
| 2016/0323287 A1* | 11/2016 | Kishikawa ........ H04L 12/40026 |
| 2017/0324579 A1 | 11/2017 | Takada et al. |
| 2018/0144119 A1 | 5/2018 | Kishikawa et al. |
| 2019/0149561 A1 | 5/2019 | Maeda et al. |
| 2019/0149562 A1 | 5/2019 | Maeda et al. |
| 2021/0178995 A1 | 6/2021 | Koyama et al. |
| 2022/0264303 A1 | 8/2022 | Hamada et al. |

FOREIGN PATENT DOCUMENTS

| | | | | |
|---|---|---|---|---|
| JP | WO 2018051607 | * | 3/2018 | ............ H04L 12/28 |
| JP | 2018-182725 A | | 11/2018 | |
| WO | 2016/080422 A1 | | 5/2016 | |
| WO | 2017/038005 A1 | | 3/2017 | |
| WO | 2018/186054 A1 | | 10/2018 | |
| WO | 2019/102911 A1 | | 5/2019 | |
| WO | 2021065068 A1 | | 4/2021 | |

OTHER PUBLICATIONS

Jun. 23, 2023 Office Action issued in U.S. Appl. No. 17/622,086.
Oct. 12, 2023 Notice of Allowance issued in U.S. Appl. No. 17/621,086.

* cited by examiner

DETECTION DEVICE, VEHICLE, DETECTION METHOD, AND DETECTION PROGRAM

TECHNICAL FIELD

The present disclosure relates to a detection device, a vehicle, a detection method, and a detection program.

This application claims priority on Japanese Patent Application No. 2019-178177 filed on Sep. 30, 2019, the entire content of which is incorporated herein by reference.

BACKGROUND ART

PATENT LITERATURE 1 (Japanese Laid-Open Patent Publication No. 2014-146868) discloses a network device as follows. That is, the network device includes a communication unit that receives data, a time management unit that manages a reception time at which the data is received, and a control unit that processes the received data. The network device periodically receives data and processes the data. The control unit records a reception time in the time management unit for each of identifiers possessed by the data received by the communication unit. In a case where first data, which has the same identifier as reference data and whose reception interval is shorter than a predetermined period, has been received, and then if second data having the same identifier as the first data is received until the predetermined period elapses from when the reference data is received, the control unit performs a period abnormality detection process. If data having the same identifier as the first data has not been received until the predetermined period elapses, the control unit performs a predetermined process for the first data.

Meanwhile, PATENT LITERATURE 2 (Japanese Laid-Open Patent Publication No. 2018-182725) discloses an unauthorized communication detection reference determination method. That is, the unauthorized communication detection reference determination method is a method, to be executed in an information processing system including a storage unit, for determining a reference message to be used for detecting an unauthorized communication in an in-vehicle network system including a network and one or more electronic control units connected to the network. This method includes: a communication pattern identification step of identifying, from information related to an attack message to the in-vehicle network system, a communication pattern indicating the feature of the attack message; a communication pattern determination step of determining whether or not a message sent to the network conforms to the communication pattern identified in the communication pattern identification step; and a reference message determination step of determining a reference message, which is used as a reference in determining whether or not the message sent to the network is an attack message, by using the determination result in the communication pattern determination step.

CITATION LIST

Patent Literature

PATENT LITERATURE 1: Japanese Laid-Open Patent Publication No. 2014-146868
PATENT LITERATURE 2: Japanese Laid-Open Patent Publication No. 2018-182725

SUMMARY OF INVENTION

A detection device of the present disclosure is configured to detect an unauthorized message in an in-vehicle network, and includes: a monitoring unit configured to monitor, as target messages, an authorized message being periodically transmitted and the unauthorized message in the in-vehicle network; a generation unit configured to generate a reference time to be used in a detection process of detecting the unauthorized message; a detection unit configured to perform the detection process, based on a time difference between a time corresponding to a transmission time of the target message based on a monitoring result of the monitoring unit, and the reference time generated by the generation unit; and an update unit configured to update a statistical value of the time difference by using the time difference between the reference time and a time corresponding to a transmission time of the target message having been determined to be normal in the detection process. When the target message has been determined to be abnormal in the detection process, the generation unit, based on a value obtained by adding a latest statistical value to the reference time, generates a new reference time to be used in the detection process for a target message to be transmitted after the target message having been determined to be abnormal.

A detection method of the present disclosure is performed in a detection device configured to detect an unauthorized message in an in-vehicle network, and includes: monitoring, as target messages, an authorized message being periodically transmitted and the unauthorized message in the in-vehicle network; generating a reference time to be used in a detection process of detecting the unauthorized message; performing the detection process, based on a time difference between a time corresponding to a transmission time of the target message based on a monitoring result of the target message, and the generated reference time; and updating a statistical value of the time difference by using the time difference between the reference time and a time corresponding to a transmission time of the target message having been determined to be normal in the detection process. In generating the reference time, when the target message has been determined to be abnormal in the detection process, a new reference time to be used in the detection process for a target message to be transmitted after the target message having been determined to be abnormal, is generated based on a value obtained by adding a latest statistical value to the reference time.

A detection program of the present disclosure is used in a detection device configured to detect an unauthorized message in an in-vehicle network, and causes a computer to function as: a monitoring unit configured to monitor, as target messages, an authorized message being periodically transmitted and the unauthorized message in the in-vehicle network; a generation unit configured to generate a reference time to be used in a detection process of detecting the unauthorized message; a detection unit configured to perform the detection process, based on a time difference between a time corresponding to a transmission time of the target message based on a monitoring result of the monitoring unit, and the reference time generated by the generation unit; and an update unit configured to update a statistical value of the time difference by using the time difference between the reference time and a time corresponding to a transmission time of the target message having been determined to be normal in the detection process. When the target message has been determined to be abnormal in the detection process, the generation unit, based on a value obtained by adding a latest statistical value to the reference time, generates a new reference time to be used in the detection process for a target message to be transmitted after the target message having been determined to be abnormal.

One mode of the present disclosure can be realized as a semiconductor integrated circuit that realizes a part or the entirety of the detection device, or can be realized as a system including the detection device. Moreover, one mode of the present disclosure can be realized as a semiconductor integrated circuit that realizes a part or the entirety of the system including the detection device, or can be realized as a program that causes a computer to execute process steps in the system including a relay device.

DESCRIPTION OF EMBODIMENTS

Figure 1:
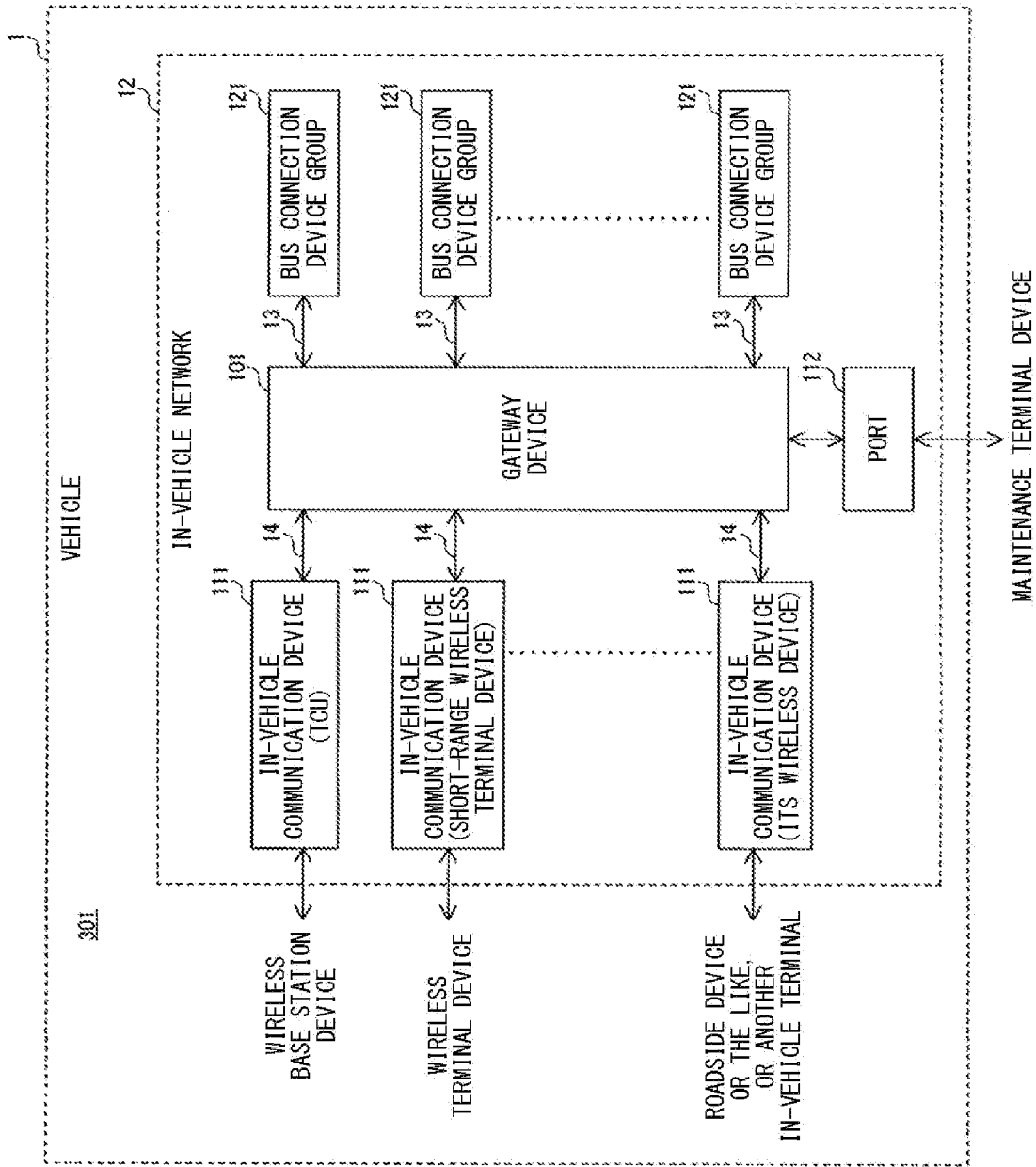
FIG. 1 shows a configuration of an in-vehicle communication system according to an embodiment of the present disclosure.

To date, a technology for improving security in an in-vehicle network has been developed.

Problems to be Solved by the Present Disclosure

A technology enabling more accurate detection of an unauthorized message in an in-vehicle network is desired beyond the technologies described in PATENT LITERATURE 1 and PATENT LITERATURE 2.

The present disclosure is made to solve the above problem, and an object of the present disclosure is to provide a detection device, a vehicle, a detection method, and a detection program capable of more accurately detecting an unauthorized message in an in-vehicle network.

Effects of the Present Disclosure

According to the present disclosure, it is possible to more accurately detect an unauthorized message in an in-vehicle network.

Description of Embodiment of the Present Disclosure

First, contents of embodiments of the present disclosure are listed and described.

(1) A detection device according to an embodiment of the present disclosure is configured to detect an unauthorized message in an in-vehicle network, and includes: a monitoring unit configured to monitor, as target messages, an authorized message being periodically transmitted and the unauthorized message in the in-vehicle network; a generation unit configured to generate a reference time to be used in a detection process of detecting the unauthorized message; a detection unit configured to perform the detection process, based on a time difference between a time corresponding to a transmission time of the target message based on a monitoring result of the monitoring unit, and the reference time generated by the generation unit; and an update unit configured to update a statistical value of the time difference by using the time difference between the reference time and a time corresponding to a transmission time of the target message having been determined to be normal in the detection process. When the target message has been determined to be abnormal in the detection process, the generation unit, based on a value obtained by adding a latest statistical value to the reference time, generates a new reference time to be used in the detection process for a target message to be transmitted after the target message having been determined to be abnormal.

As described above, the statistical value is updated by using the time difference between the reference time and the time corresponding to the transmission time of the target message having been determined to be normal in the detection process, and when the target message has been determined to be abnormal in the detection process, the new reference time is generated based on the value obtained by adding the statistical value of the time difference to the reference time. In this configuration, since the detection process is prevented from being performed based on a time corresponding to a transmission time of an unauthorized message, it is possible to inhibit erroneous detection in the detection process for the target message to be transmitted next to the target message having been determined to be abnormal. Therefore, it is possible to more accurately detect an unauthorized message in the in-vehicle network.

(2) Preferably, the detection unit detects an abnormality regarding a first target message, based on a time difference between the reference time and a time corresponding to a transmission time of the first target message that is the target message, and on a time difference between the reference time and a time corresponding to a transmission time of a second target message that is the target message to be transmitted after the first target message.

In the above configuration, for example, in the detection process using the reference time, even in a case where a plurality of target messages are transmitted within a time period in which the target messages are determined to be normal and an unauthorized message included in the plurality of target messages is erroneously determined to be an authorized message, it is possible to determine that there is a possibility that the plurality of target messages are abnormal. Thus, for example, gray decision can be made on the unauthorized message that could not be detected in the detection process.

(3) Preferably, when the target message has been determined to be normal in the detection process, the generation unit, based on a time corresponding to a transmission time of the target message determined to be normal, generates a new reference time to be used in the detection process for a target message to be transmitted after the target message having been determined to be normal.

In the above configuration, for example, a time corresponding to an actual transmission time of the target message having been determined to be normal is set as a new reference time. Thus, it is possible to perform a more accurate detection process taking into consideration a change, in the transmission time of the target message, caused by a communication delay or the like.

(4) Preferably, the generation unit, when generating the reference time, uses a delay time due to an arbitration process performed when the target message is transmitted.

In the above configuration, for example, when the new reference time is generated by adding the latest statistical value of the time difference to the reference time, a more accurate detection process can be performed by using the reference time taking into consideration a change, in the transmission time of the target message, caused by a communication delay or the like.

(5) A vehicle according to the embodiment of the present disclosure is provided with the detection device.

In the above configuration, in the vehicle provided with the detection device, an unauthorized message in the in-vehicle network can be more accurately detected.

(6) A detection method according to the embodiment of the present disclosure is performed in a detection device configured to detect an unauthorized message in an in-vehicle network, and includes: monitoring, as target messages, an authorized message being periodically transmitted and the unauthorized message in the in-vehicle network; generating a reference time to be used in a detection process of detecting the unauthorized message; performing the detection process, based on a time difference between a time corresponding to a transmission time of the target message based on a monitoring result of the target message, and the generated reference time; and updating a statistical value of the time difference by using the time difference between the reference time and a time corresponding to a transmission time of the target message having been determined to be normal in the detection process. In generating the reference time, when the target message has been determined to be abnormal in the detection process, a new reference time to be used in the detection process for a target message to be transmitted after the target message having been determined to be abnormal, is generated based on a value obtained by adding a latest statistical value to the reference time.

As described above, the statistical value is updated by using the time difference between the reference time and the time corresponding to the transmission time of the target message having been determined to be normal in the detection process, and when the target message has been determined to be abnormal in the detection process, the new reference time is generated based on the value obtained by adding the statistical value of the time difference to the reference time. In this method, since the detection process is prevented from being performed based on a time corresponding to a transmission time of an unauthorized message, it is possible to inhibit erroneous detection in the detection process for the target message to be transmitted next to the target message having been determined to be abnormal. Therefore, it is possible to more accurately detect an unauthorized message in the in-vehicle network.

(7) A detection program according to the embodiment of the present disclosure is used in a detection device configured to detect an unauthorized message in an in-vehicle network, and causes a computer to function as: a monitoring unit configured to monitor, as target messages, an authorized message being periodically transmitted and the unauthorized message in the in-vehicle network; a generation unit configured to generate a reference time to be used in a detection process of detecting the unauthorized message; a detection unit configured to perform the detection process, based on a time difference between a time corresponding to a transmission time of the target message based on a monitoring result of the monitoring unit, and the reference time generated by the generation unit; and an update unit configured to update a statistical value of the time difference by using the time difference between the reference time and a time corresponding to a transmission time of the target message having been determined to be normal in the detection process. When the target message has been determined to be abnormal in the detection process, the generation unit, based on a value obtained by adding a latest statistical value to the reference time, generates a new reference time to be used in the detection process for a target message to be transmitted after the target message having been determined to be abnormal.

As described above, the statistical value is updated by using the time difference between the reference time and the time corresponding to the transmission time of the target message having been determined to be normal in the detection process, and when the target message has been determined to be abnormal in the detection process, the new reference time is generated based on the value obtained by adding the statistical value of the time difference to the reference time. In this configuration, since the detection process is prevented from being performed based on a time corresponding to a transmission time of an unauthorized message, it is possible to inhibit erroneous detection in the detection process for the target message to be transmitted next to the target message having been determined to be abnormal. Therefore, it is possible to more accurately detect an unauthorized message in the in-vehicle network.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

[Configuration and Basic Operation]

FIG. 1 shows a configuration of an in-vehicle communication system according to an embodiment of the present disclosure.

With reference to FIG. 1, an in-vehicle communication system 301 includes a gateway device 101, a plurality of in-vehicle communication devices 111, and a plurality of bus connection device groups 121. The gateway device 101 is an example of a detection device. The in-vehicle communication system 301 is mounted in a vehicle 1.

Figure 2:
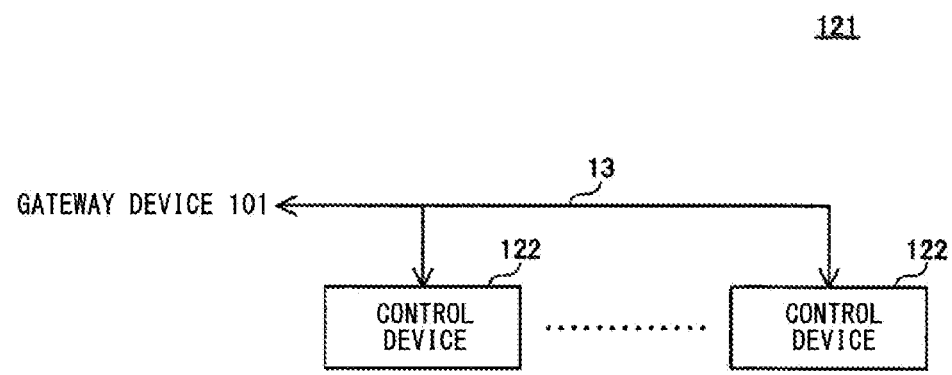
FIG. 2 shows a configuration of a bus connection device group according to the embodiment of the present disclosure.

FIG. 2 shows a configuration of a bus connection device group according to the embodiment of the present disclosure.

With reference to FIG. 2, the bus connection device group 121 includes a plurality of control devices 122. The bus connection device group 121 may not necessarily include a plurality of control devices 122, and may include one control device 122.

An in-vehicle network 12 includes a plurality of in-vehicle devices that are devices provided inside the vehicle 1. Specifically, the in-vehicle network 12 includes a plurality of in-vehicle communication devices 111 and a plurality of control devices 122, which are examples of the in-vehicle devices. As long as the in-vehicle network 12 includes a plurality of in-vehicle devices, the in-vehicle network 12 may be configured to include a plurality of in-vehicle communication devices 111 and not to include any control device 122, may be configured not to include any in-vehicle communication device 111 and to include a plurality of control devices 122, or may be configured to include one in-vehicle communication device 111 and one control device 122.

In the in-vehicle network 12, the in-vehicle communication device 111 communicates with a device outside the vehicle 1, for example. Specifically, the in-vehicle communication device 111 is a TCU (Telematics Communication Unit), a short-range wireless terminal device, or an ITS (Intelligent Transport Systems) wireless device, for example.

The TCU can perform wireless communication with a wireless base station device in accordance with a communication standard such as LTE (Long Term Evolution) or 3G, and can perform communication with the gateway device 101, for example. The TCU relays information to be used in services such as navigation, vehicle burglar prevention, remote maintenance, and FOTA (Firmware Over The Air), for example.

For example, the short-range wireless terminal device can perform wireless communication with a wireless terminal device such as a smartphone held by a person in the vehicle 1, i.e., an occupant, in accordance with a communication standard such as Wi-Fi (registered trademark) and Bluetooth (registered trademark), and can perform communication with the gateway device 101. The short-range wireless terminal device relays information to be used in a service such as entertainment, for example.

For example, the short-range wireless terminal device can perform wireless communication with a wireless terminal device such as a smart key held by the occupant and with a wireless terminal device provided at a tire, in accordance with a predetermined communication standard by using a radio wave in an LF (Low Frequency) band or a UHF (Ultra High Frequency) band, and can perform communication with the gateway device 101. The short-range wireless terminal device relays information to be used in services such as smart entry and TPMS (Tire Pressure Monitoring System), for example.

The ITS wireless device can perform roadside-to-vehicle communication with a roadside device, such as an optical beacon, a radio wave beacon, or an ITS spot, provided in the vicinity of a road, can perform vehicle-to-vehicle communication with an in-vehicle terminal mounted in another vehicle, and can perform communication with the gateway device 101, for example. The ITS wireless device relays information to be used in services such as congestion alleviation, safe driving support, and route guidance, for example.

The gateway device 101 can, via a port 112, transmit/receive data for update or the like of firmware, and data accumulated by the gateway device 101 to/from a maintenance terminal device outside the vehicle 1, for example.

The gateway device 101 is connected to in-vehicle devices via buses 13, 14, for example. Specifically, each bus 13, 14 is a bus according to, for example, a standard of CAN (Controller Area Network) (registered trademark), FlexRay (registered trademark), MOST (Media Oriented Systems Transport) (registered trademark), Ethernet (registered trademark), LIN (Local Interconnect Network), or the like.

In this example, each in-vehicle communication device 111 is connected to the gateway device 101 via a corresponding bus 14 according to the Ethernet standard. Each control device 122 in each bus connection device group 121 is connected to the gateway device 101 via a corresponding bus 13 according to the CAN standard.

The buses 13 are provided for the respective types of systems, for example. Specifically, the buses 13 are implemented as a drive-related bus, a chassis/safety-related bus, a body/electrical-equipment-related bus, and an AV/information-related bus, for example.

The drive-related bus has, connected thereto, an engine control device, an AT (Automatic Transmission) control device, and an HEV (Hybrid Electric Vehicle) control device, which are examples of the control device 122. The engine control device, the AT control device, and the HEV control device control an engine, AT, and switching between the engine and a motor, respectively.

The chassis/safety-related bus has, connected thereto, a brake control device, a chassis control device, and a steering control device, which are examples of the control device 122. The brake control device, the chassis control device, and the steering control device control a brake, a chassis, and steering, respectively.

The body/electrical-equipment-related bus has, connected thereto, an instrument indication control device, an air conditioner control device, a burglar prevention control device, an air bag control device, and a smart entry control device, which are examples of the control device 122. The instrument indication control device, the air conditioner control device, the burglar prevention control device, the air bag control device, and the smart entry control device control instruments, an air conditioner, a burglar prevention mechanism, an air bag mechanism, and smart entry, respectively.

The AV/information-related bus has, connected thereto, a navigation control device, an audio control device, an ETC (Electronic Toll Collection System) (registered trademark)

control device, and a telephone control device, which are examples of the control device 122. The navigation control device, the audio control device, the ETC control device, and the telephone control device control a navigation device, an audio device, an ETC device, and a mobile phone, respectively.

The bus 13 need not necessarily have the control devices 122 connected thereto, and may have connected thereto a device other than the control devices 122.

The gateway device 101 is a central gateway (CGW), for example, and can perform communication with the in-vehicle devices.

The gateway device 101 performs a relay process of relaying information transmitted/received between control devices 122 that are connected to different buses 13 in the vehicle 1, information transmitted/received between in-vehicle communication devices 111, and information transmitted/received between a control device 122 and an in-vehicle communication device 111, for example.

More specifically, in the vehicle 1, for example, a message is periodically transmitted from an in-vehicle device to another in-vehicle device in accordance with a predetermined rule. In this example, a message that is periodically transmitted from a control device 122 to another control device 122 is described. However, the same also applies to a message that is transmitted between a control device 122 and an in-vehicle communication device 111, and a message that is transmitted between in-vehicle communication devices 111.

Transmission of a message may be performed by broadcast, unicast, or multicast. Hereinafter, a message that is periodically transmitted is also referred to as a periodic message.

In the vehicle 1, a message that is non-periodically transmitted from a control device 122 to another control device 122 is present, in addition to a periodic message. Each message includes an ID (Identifier) for identifying the content of the message, transmission source, message number, and the like. Whether or not the message is a periodic message can be discerned by the ID included in the message.

The gateway device 101 functions as a detection device, and performs a detection process of detecting an unauthorized message in the in-vehicle network 12.

[Configuration of Gateway Device]

Figure 3:
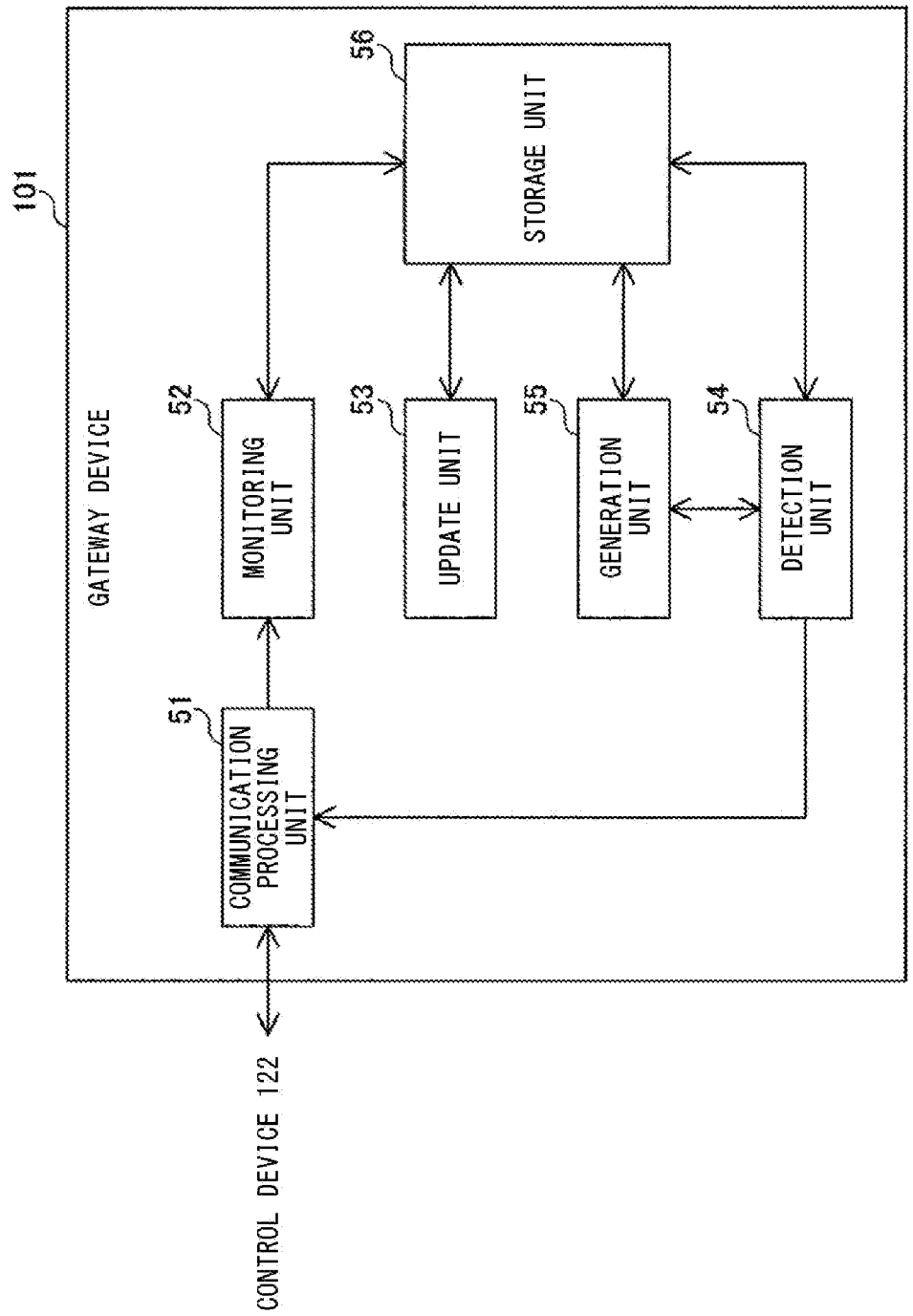
FIG. 3 shows a configuration of a gateway device in the in-vehicle communication system according to the embodiment of the present disclosure.

FIG. 3 shows a configuration of the gateway device in the in-vehicle communication system according to the embodiment of the present disclosure.

With reference to FIG. 3, the gateway device 101 includes a communication processing unit 51, a monitoring unit 52, an update unit 53, a detection unit 54, a generation unit 55, and a storage unit 56. The communication processing unit 51, the monitoring unit 52, the update unit 53, the detection unit 54, and the generation unit 55 are each realized by a processor such as a CPU (Central Processing Unit) or a DSP (Digital Signal Processor).

The monitoring unit 52 monitors an authorized periodic message and an unauthorized message as messages to be subjected to the detection process by the gateway device 101, i.e., as target messages M.

The detection unit 54 performs the detection process of detecting an unauthorized message.

The generation unit 55 generates a reference time to be used in the detection process. The generation unit 55 notifies the detection unit 54 of the generated reference time.

The storage unit 56 stores therein a statistical value of a time difference X between a reception time of a target message M and a reference time tr. The storage unit 56 is a flash memory, for example. The storage unit 56 may be provided outside the gateway device 101.

The update unit 53 updates the statistical value. For example, the update unit 53 updates the statistical value stored in the storage unit 56.

[Communication Processing Unit]

The communication processing unit 51 performs a relay process of relaying a message transmitted between control devices 122.

For example, upon receiving a message from a certain control device 122 via a corresponding bus 13, the communication processing unit 51 attaches, to the received message, a time stamp indicating the reception time of the message. Then, the communication processing unit 51 transmits the message having the time stamp attached thereto, to another control device 122 via a corresponding bus 13.

[Monitoring Unit]

The monitoring unit 52 monitors the target messages M as described above.

Figure 4:
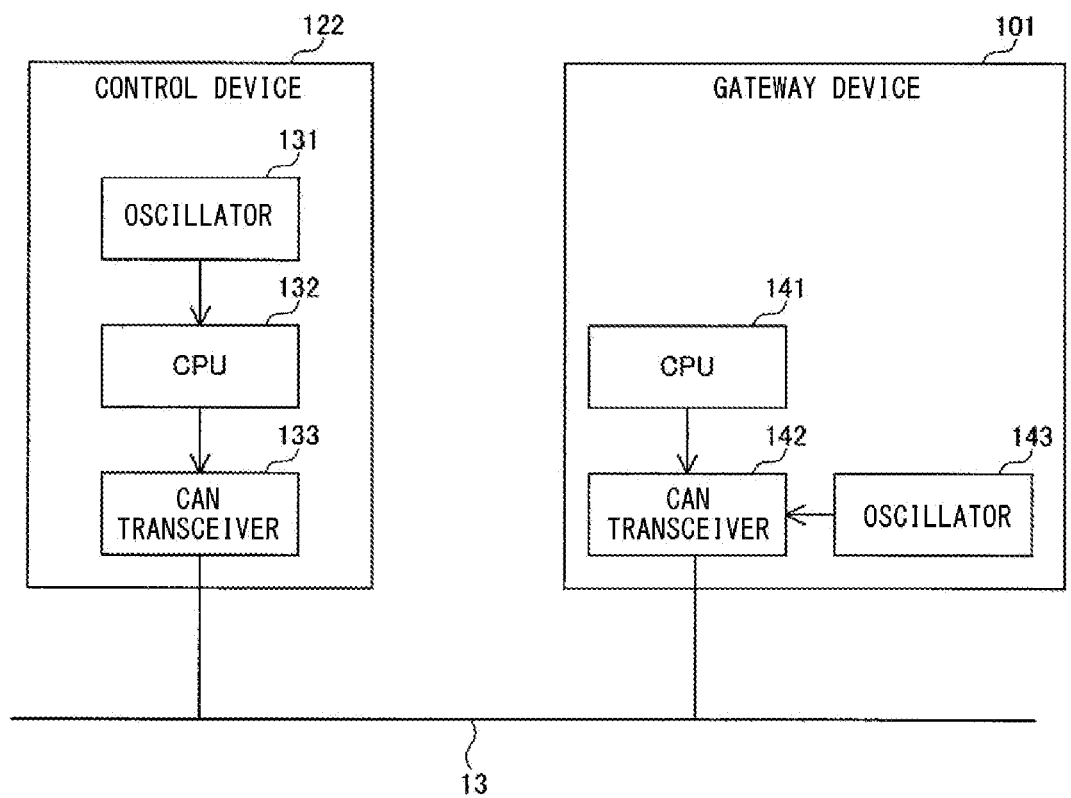
FIG. 4 shows an example of hardware configurations of control devices and a gateway device in the in-vehicle communication system according to the embodiment of the present disclosure.

FIG. 4 shows an example of a hardware configuration of the control device and the gateway device in the in-vehicle communication system according to the embodiment of the present disclosure.

With reference to FIG. 4, the control device 122 includes an oscillator 131, a CPU (Central Processing Unit) 132, and a CAN transceiver 133.

The gateway device 101 includes a CPU 141, a CAN transceiver 142, and an oscillator 143. The CPU 141 implements a part or the entirety of the monitoring unit 52, the update unit 53, the detection unit 54, and the generation unit 55. The CAN transceiver 142 implements a part or the entirety of the communication processing unit 51.

The control device 122 transmits a periodic message in a design transmission cycle T that is a transmission cycle by design. More specifically, the CPU 132 in the control device 122 broadcasts or unicasts the periodic message via the CAN transceiver 133 according to a timing of a clock generated based on an oscillation signal from the oscillator 131.

The CAN transceiver 142 in the gateway device 101 attaches a time stamp indicating a reception time to the periodic message received from the control device 122, according to a timing of a clock generated based on an oscillation signal from the oscillator 143.

In the following description, it is assumed that the control device 122 transmits target messages M to be subjected to the detection process by the gateway device 101.

For example, a part of messages that the gateway device 101 receives from the control device 122 is an unauthorized message. The monitoring unit 52 monitors the authorized periodic message and the unauthorized message from the control device 122 as target messages M.

The monitoring unit 52 monitors messages relayed by the communication processing unit 51 to acquire a reception time ta of a target message M.

For example, the storage unit 56 stores therein an ID of the target message M. Hereinafter, the ID of the target message M is also referred to as a target ID.

When the communication processing unit 51 has received a message to be subjected to the relay process, the monitoring unit 52 confirms the ID included in the message received by the communication processing unit 51, and the target ID stored in the storage unit 56.

When the ID included in the message received by the communication processing unit 51 matches the target ID, the monitoring unit 52 recognizes that the message received by the communication processing unit 51 is a target message M, and acquires a reception time ta of the target message M by referring to a time stamp attached to the target message M.

Upon acquiring the reception time ta of the target message M, the monitoring unit 52 stores, in the storage unit 56, reception information indicating the acquired reception time ta such that the reception information is associated with a reception number N indicating the ordinal number of the target message M which was received by the communication processing unit 51.

[Detection Unit]

The detection unit 54 performs a detection process, based on a time difference X between a time corresponding to a transmission time of a target message M based on a monitoring result of the monitoring unit 52, and a reference time tr generated by the generation unit 55. More specifically, the detection unit 54 performs the detection process, based on the time difference X between a reception time of the target message M and the reference time tr.

Figure 5:
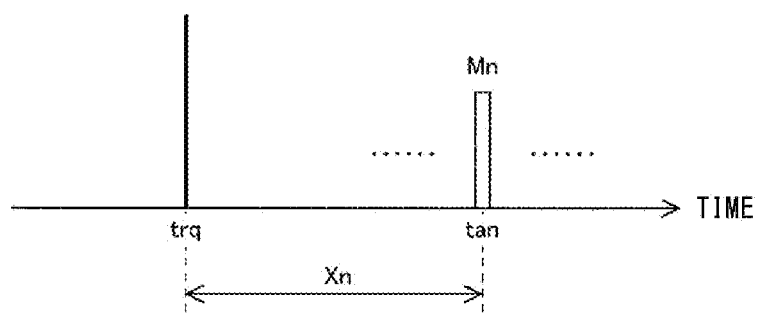
FIG. 5 shows an example of a distribution of reception times of target messages in the in-vehicle communication system according to the embodiment of the present disclosure.

FIG. 5 shows an example of a distribution of reception times of target messages in the in-vehicle communication system according to the embodiment of the present disclosure. In FIG. 5, the horizontal axis represents time.

With reference to FIG. 5, for example, the detection unit 54 performs the detection process, based on a time difference Xn between a reception time tan of an n-th target message Mn whose reception number N is n, and a reference time trq notified from the generation unit 55. Here, n is an integer not smaller than 1.

More specifically, when new reception information including the reception time tan of the target message Mn has been stored in the storage unit 56, the detection unit 54 determines whether or not the target message Mn is an unauthorized message, based on a statistical distance of the time difference Xn between the reception time tan indicated by the reception information and the reference time trq.

For example, the detection unit 54 determines whether or not the target message Mn is an unauthorized message, based on a Mahalanobis distance D^2, as an example of the statistical distance, expressed by formula (1) below. Note that "D^2" means the second power of D.

[Math. 1]

$$D^2 = (Xn-\mu)^T \Sigma^{-1} (Xn-\mu) \quad (1)$$

For example, when the Mahalanobis distance D^2 calculated based on the reception time tan of the target message Mn and the reference time trq is equal to or smaller than a threshold value Th, the detection unit 54 determines that the target message Mn is not an unauthorized message. Meanwhile, when the Mahalanobis distance D^2 is greater than the threshold value Th, the detection unit 54 determines that the target message Mn is an unauthorized message.

The threshold value Th used for the comparison with the Mahalanobis distance D^2 is preferably an appropriate value that allows whether or not the target message Mn is an unauthorized message to be accurately determined.

For example, the manufacturer of the vehicle 1 calculates, in advance, a Mahalanobis distance D^2 on the basis of a time difference Xn that is calculated when all the target messages Mn are authorized messages, by using a gateway device 101 of a test vehicle of the same type as the vehicle 1.

Figure 6:
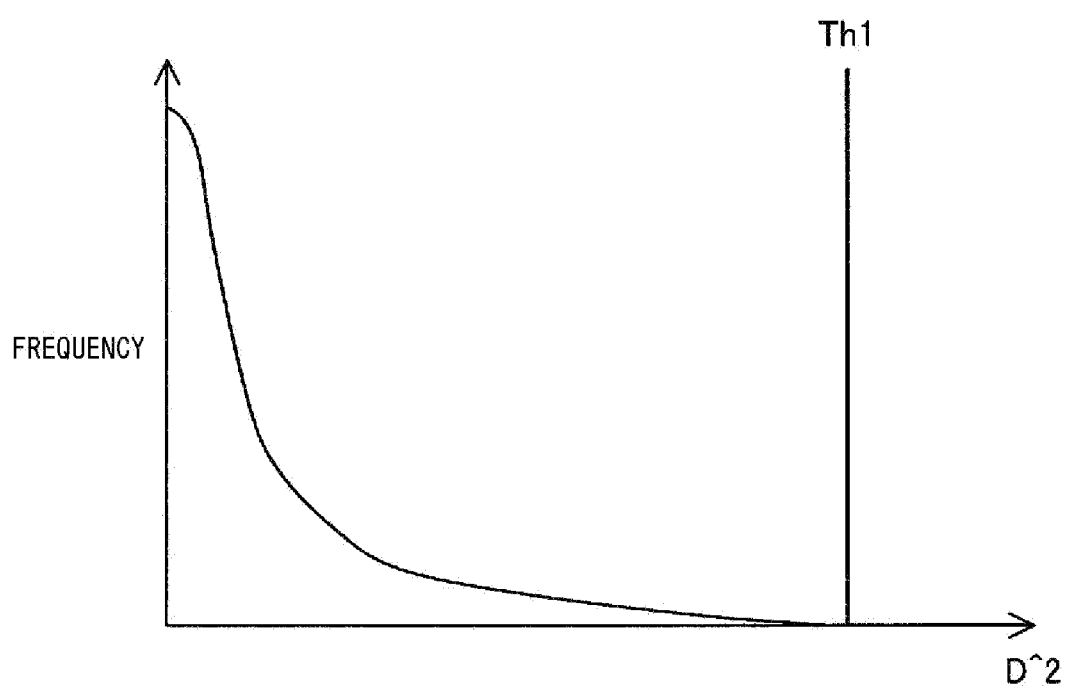
FIG. 6 shows an example of a frequency distribution of a Mahalanobis distance that is calculated when all the target messages are authorized messages, in the in-vehicle communication system according to the embodiment of the present disclosure.

FIG. 6 shows an example of a frequency distribution of the Mahalanobis distance calculated when all the target messages are authorized messages in the in-vehicle communication system according to the embodiment of the present disclosure.

With reference to FIG. 6, the frequency decreases with an increase in the Mahalanobis distance D^2, which is calculated by using the time difference X when all the target messages M are authorized messages.

For example, the storage unit 56 stores therein the frequency distribution of the Mahalanobis distance D^2 shown in FIG. 6.

For example, preferably, the detection unit 54, at startup, acquires the frequency distribution of the Mahalanobis distance D^2 shown in FIG. 6 from the storage unit 56, and sets a threshold value Th1 such that the threshold value Th1 becomes smallest in a range where an FPR (False Positive Rate) becomes zero. Here, the FPR refers to a false positive rate and is represented as false positive/(false positive+true negative). The true negative is the frequency at which an authorized message is recognized as an authorized message, and the false positive is the frequency at which an authorized message is detected as an unauthorized message. The storage unit 55 may be configured to store the threshold value Th1 determined in advance by the manufacturer of the vehicle 1. In this case, the detection unit 54, at startup, acquires the threshold value Th1 from the storage unit 55.

Figure 7:
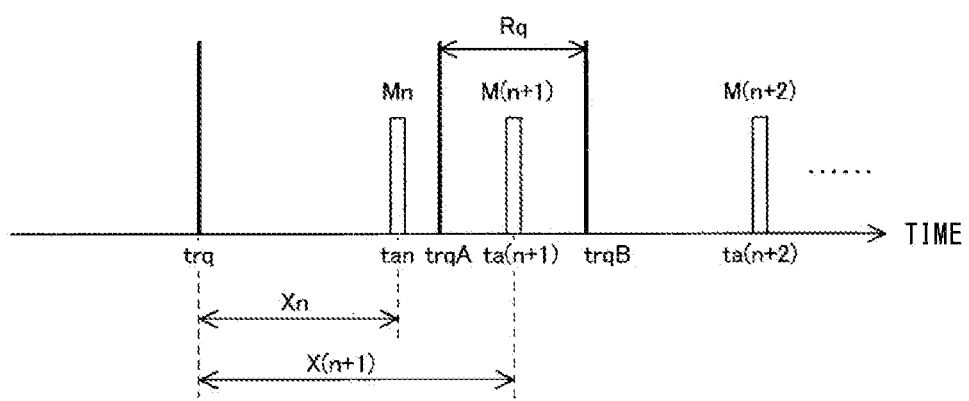
FIG. 7 shows another example of a distribution of reception times of target messages in the in-vehicle communication system according to the embodiment of the present disclosure.

FIG. 7 shows another example of a distribution of reception times of target messages in the in-vehicle communication system according to the embodiment of the present disclosure. In FIG. 7, the horizontal axis represents time.

With reference to FIG. 7, for example, when notified of a reference time trq from the generation unit, the detection unit 54, based on the notified reference time trq and the threshold value Th1, sets a criterion to be used for determining whether or not a target message M is an unauthorized message.

More specifically, when notified of the reference time trq from the generation unit 55, the detection unit 54, based on the notified reference time trq and the threshold value Th1, sets threshold times trqA, trqB indicating a reception time to when the calculated Mahalanobis distance D^2 becomes a value equal to the threshold value Th1. In the following description, a time range, from the threshold time trqA to the threshold time trqB, defined by the threshold times trqA, trqB is also referred to as an allowable range Rq.

Based on the set allowable range Rq, the detection unit 54 determines whether or not a target message M is an unauthorized message.

More specifically, when a reception time tan of a target message Mn is within the allowable range Rq, the detection unit 54 determines that the target message Mn is not an unauthorized message. Meanwhile, when the reception time tan of the target message Mn is a time before the threshold time trqA as shown in the example of FIG. 7, the detection unit 54 determines that the target message Mn is an unauthorized message.

The detection unit 54 outputs determination information indicating a determination result based on the determination times trqA, trqB and the reception time tan, to the communication processing unit 51.

When the determination information received from the detection unit 54 indicates that the target message Mn is not an unauthorized message, the communication processing unit 51 transmits the target message Mn to the control device 122 of a transmission destination.

Meanwhile, when the determination information received from the detection unit 54 indicates that the target message Mn is an unauthorized message, the communication processing unit 51 performs the following process.

That is, the communication processing unit 51 records the target message Mn indicated by the determination information. Moreover, the communication processing unit 51 transmits, to a higher-order device inside or outside the vehicle 1, alarm information indicating that an unauthorized message is being transmitted in a bus 13.

[Another Example of Detection Process]

(Gray Decision)

For example, the detection unit 54 detects an abnormality regarding a target message Mn, based on a time difference between the reference time trq and a time corresponding to a transmission time of the target message Mn, and on a time difference between the reference time trq and a time corresponding to a transmission time of a target message M(n+1) transmitted after the target message Mn. More specifically, the detection unit 54 detects an abnormality regarding the target message Mn, based on a time difference between the reception time of the target message Mn and the reference time trq, and on a time difference between the reception time of the target message M(n+1) and the reference time trq.

Figure 8:
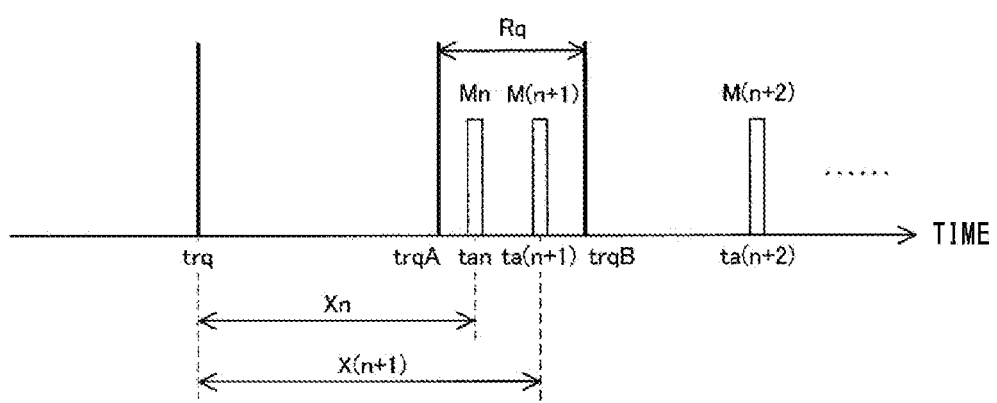
FIG. 8 shows another example of a distribution of reception times of target messages in the in-vehicle communication system according to the embodiment of the present disclosure.

FIG. 8 shows another example of a distribution of reception times of target messages in the in-vehicle communication system according to the embodiment of the present disclosure. In FIG. 8, the horizontal axis represents time.

With reference to FIG. 8, as described above, the detection unit 54 sets the threshold times trqA, trqB and the allowable range Rq, based on the reference time trq notified from the generation unit 55 and on the threshold value Th1.

When reception information including a reception time tan of a target message Mn has been stored in the storage unit 56 by the monitoring unit 52, the detection unit 54 determines whether or not the target message Mn is an unauthorized message, based on the reception time tan, and on the set threshold times trqA, trqB and allowable range Rq.

For example, when the reception time tan of the target message Mn is within the allowable range Rq, the detection unit 54 determines that the target message Mn is not an unauthorized message.

When new reception information including a reception time ta(n+1) of a target message M(n+1) has been stored in the storage unit 56 by the monitoring unit 52, the detection unit 54 determines whether or not the target message M(n+1) is an unauthorized message, based on the reception time ta(n+1) indicated by the new reception information and on the set threshold times trqA, trqB and allowable range Rq.

For example, when the reception time ta(n+1) of the target message M(n+1) is within the allowable range Rq, the detection unit 54 determines that the target message M(n+1) is not an unauthorized message.

In the detection process based on the allowable range Rq, in a case where the detection unit 54 has determined that the target message Mn is not an unauthorized message and thereafter has further determined that the target message M(n+1) is not an unauthorized message, the detection unit 54 determines that there is a possibility that the target messages Mn, M(n+1) are abnormal, that is, the detection unit 54 makes gray decision.

In a case where the detection unit 54 has determined that the target message Mn is neither an unauthorized message nor a gray-determined message, that is, when the detection unit 54 has determined that the target message Mn is an authorized message, the detection unit 54 stores, in the storage unit 56, the reception time tan of the target message Mn determined as an authorized message, the reference time trq, and time difference information indicating the time difference Xn between the reception time tan and the reference time trq.

(Detection Process Using Support Vector Machine)

In the gateway device 101 according to the embodiment of the present disclosure, the detection unit 54 calculates the Mahalanobis distance D^2 based on the time difference Xn between the reception time tan of the target message Mn and the reference time trq, and determines whether or not the target message Mn is an unauthorized message, based on the comparison result between the calculated Mahalanobis distance D^2 and the threshold value Th. However, the present disclosure is not limited thereto.

The detection unit 54 may be configured to determine whether or not a target message Mn is an unauthorized message by using a support vector machine, for example. The detection unit 54 may use a one-class support vector machine or a multiclass support vector machine.

More specifically, when a classification score f(Xn) calculated according to formula (2) below is zero or more, the detection unit 54 determines that the target message Mn is not an unauthorized message. When the calculated classification score f(Xn) is less than zero, the detection unit 54 determines that the target message Mn is an unauthorized message.

[Math. 2]

$$f(Xn) = \sum_{i=1}^{m} yi \times Wi \times K(x, xi) + b \qquad (2)$$

In the above formula, K(x, xi) is a kernel function. Specifically, the kernel function is linear kernel, polynomial kernel, Gaussian kernel (in formula (3) below), or sigmoid kernel.

[Math. 3]

$$K(x1, x2) = \exp\left(\frac{\|x1 - x2\|}{\sigma^{\wedge}2}\right) \qquad (3)$$

In addition, x is a vector of the time difference Xn between the reception time tan of the target message Mn and the reference message trq, xi is a support vector, and yi is a value corresponding to each of classes. For example, when using the one-class support vector machine, yi is 1. Wi is a weight vector, and b is a bias. The aforementioned xi, yi, Wi, and b are parameters obtained in advance by using a gateway device 101 of a test vehicle of the same type as the vehicle 1, through machine learning using authorized messages.

When using the one-class support vector machine, the parameters are set by unsupervised learning. More specifically, time differences Xn between the reception time tan of the target message Mn which is an authorized message and a plurality of reference times trq are calculated, and the calculated time differences Xn are classified into a data set for learning and a data set for verification.

Then, machine learning is performed using the data set for learning, and a classification score f(Xn) of the data set for verification is calculated using parameters obtained through the machine learning and the above formula (2). Then, it is confirmed whether the classification score f(Xn) is not less than zero, or less than zero. That is, it is confirmed whether the data set for verification is determined as an authorized message or an unauthorized message. Then, the parameters are appropriately adjusted such that the FPR of the determination result for the data set for verification has a desired value, and machine learning using the data set for learning is again performed.

When using the multiclass support vector machine, the parameters are set by supervised learning. More specifically, time differences Xn between the reception time tan of the target message Mn which is an authorized message and a plurality of reference times trq are calculated, and the calculated time differences Xn are set in a normal data group.

Then, an unauthorized data group that is a data group of a plurality time differences Xnr greater than the time differences Xn of the normal data group, and an unauthorized data group that is a data group of a plurality of time differences Xns smaller than the time differences Xn of the normal data group, are generated. The normal data group and the unauthorized data group are classified into a data set for learning and a data set for verification.

Then, machine learning is performed using the data set for learning, and a classification score f(Xn) of the data set for verification is calculated using parameters obtained through the machine learning and the above formula (2). Then, it is confirmed, based on the classification score f(Xn), whether the data set for verification is determined as an authorized message or an unauthorized message. Then, the values of the time differences Xns, Xnr in the unauthorized data groups, i.e., gaps between the unauthorized data groups and the normal data group, and the parameters are appropriately adjusted such that the FPR of the determination result for the data set for verification has a desired value, and machine learning using the data set for learning is again performed.

(Detection Process Using Decision Tree)

The detection unit 54 may be configured to determine whether or not a target message Ma is an unauthorized message, by using a decision tree, for example. The algorithm of the decision tree is, for example, CART (Classification And Regression Trees), C4.5, or the like.

Parameters of the decision tree are set by supervised learning. More specifically, time differences Xn between a reception time tan of a target message Mn which is an authorized message and a plurality of reference times trq are calculated, and the calculated time differences Xn are set in a normal data group.

Then, an unauthorized data group that is a data group of a plurality of time differences Xnr greater than the time differences Xn in the normal data group, and an unauthorized data group that is a data group of a plurality of time differences Xns smaller than the time differences Xn in the normal data group, are generated. The normal data group and the unauthorized data group are classified into a data set for learning and a data set for verification.

Then, machine learning for the decision tree using the algorithm such as CART or C4.5 is performed using the data set for learning, and it is confirmed whether the data set for verification is determined to be an authorized message or determined to be an unauthorized message in the case where the decision tree obtained through the machine learning is used. Then, the values of the time differences Xns, Xnr in the unauthorized data groups, i.e., gaps between the unauthorized data groups and the normal data group, and the learning parameters for the decision tree are appropriately adjusted such that the FPR of the determination result for the data set for verification has a desired value, and machine learning using the data set for learning is again performed.

(Request for Generation of New Reference Time)

In a case where new reception information including a reception time ta(n+2) of a target message M(n+2) has been stored in the storage unit 56 and the reception time ta(n+2) indicated by the new reception information is a time after the threshold time trqB, the detection unit 54 notifies the generation unit 55 of a generation request indicating that a new reference time tr(q+1) should be generated.

For example, the detection unit 54 notifies the generation unit 55 of the generation request having a content according to a determination result in a detection process using a reference time trq.

More specifically, when the detection unit 54 has detected an unauthorized message or when the detection unit 54 has detected an abnormality regarding the target message M, i.e., has made gray decision, in the detection process using the reference time trq, the detection unit 54 notifies the generation unit 55 of, as the above generation request, a generation request Y1 indicating that an abnormality has occurred in the detection process using the reference time trq.

Meanwhile, when the detection unit 54 has not detected an unauthorized message and has not made gray decision in the detection process using the reference time trq, the detection unit 54 notifies the generation unit 55 of, as the above generation request, a generation request Y2 indicating that an abnormality has not occurred in the detection process using the reference time trq.

As described later, upon receiving the generation request Y1 or the generation request Y2 from the detection unit 54, the generation unit 55 notifies the detection unit 54 of a new reference time tr(q+1) as a response to the received generation request Y1 or generation request Y2.

When notified of the new reference time tr(q+1) from the generation unit 55, the detection unit 54 sets an allowable range R(q+1) defined by new threshold times tr(q+1)A, tr(q+1)B, by using the notified reference time tr(q+1).

Then, based on the set allowable range R(q+1), the detection unit 54 determines whether or not the target message M(n+2) is an unauthorized message.

(Initial Request for Generation of Reference Time)

When the communication processing unit 51 has received a first target message M from the control device 122, the detection unit 54 notifies the generation unit 55 of a generation request Y3 indicating that an initial reference time tr1 as an initial value should be generated, in order to start a detection process.

More specifically, in a case where a target message Mn, of K continuous target messages M, is within an allowable range R(n−1) that is set by using a reception time ta(n−1) of an immediately preceding target message M(n−1) as a temporary reference time tr(n−1), the detection unit 54 notifies the generation unit 55 of the reception times to of the K target messages M and the generation request Y3.

Figure 9:
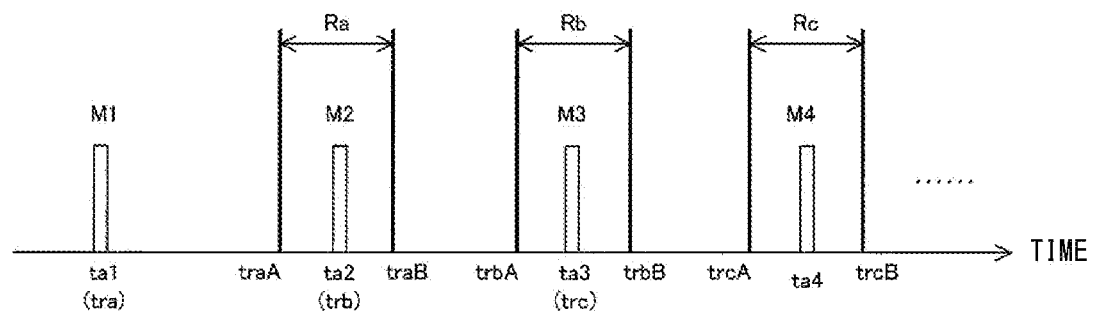
FIG. 9 shows another example of a distribution of reception times of target messages in the in-vehicle communication system according to the embodiment of the present disclosure.

FIG. 9 shows another example of a distribution of reception times of target messages in the in-vehicle communication system according to the embodiment of the present disclosure. In FIG. 9, the horizontal axis represents time. FIG. 9 shows a case where K is 4.

With reference to FIG. 9, the detection unit 54 uses, as the temporary reference time tra, a reception time ta1 of a first target message M1 from the control device 122, and sets threshold times traA, traB and an allowable range Ra, based on the temporary reference time tra and the threshold value Th1.

Then, when a reception time ta2 of a second target message M2 from the control device 122 is within the allowable range Ra, the detection unit 54 uses the reception time ta2 as a temporary reference time trb, and sets threshold times trbA, trbB and an allowable range Rb, based on the temporary reference time trb and the threshold value Th1.

Moreover, when a reception time ta3 of a third target message M3 from the control device 122 is within the allowable range Rb, the detection unit 54 uses the reception time ta3 as a temporary reference time trc, and sets threshold times trcA, trcB and an allowable range Rc, based on the temporary reference time trc and the threshold value Th1.

Moreover, when a reception time ta4 of a fourth target message M4 from the control device 122 is within the allowable range Rc, the detection unit 54 notifies the generation unit 55 of the reception times ta1, ta2, ta3, ta4 of the target messages M1, M2, M3, M4 and the generation request Y3.

Meanwhile, when, for example, the reception time ta3 of the third target message M3 is outside the allowable range Rb, the detection unit 54 repeats the aforementioned process until a target message Mn, of K continuous target messages M including the third and subsequent target messages M, becomes within an allowable range R(n−1) that is set by using, as a temporary reference time tr(n−1), a reception time ta(n−1) of an immediately preceding target message M(n−1).

As described later, upon receiving the generation request Y3 from the detection unit 54, the generation unit 55 notifies the detection unit 54 of the initial reference time tr1 as a response to the received generation request Y3.

[Update Unit]

As described above, the storage unit 56 stores therein a statistical value of a time difference X between a reception time of a target message M and a reference time tr.

The update unit 53 updates the statistical value in the storage unit 56 by using a time difference between the reference time tr and a time corresponding to a transmission time of a target message Mn having been determined to be normal in the detection process. More specifically, the update unit 53 updates the statistical value in the storage unit 56 by using a time difference X between the reference time tr and a reception time ta of the target message M having been determined to be normal.

For example, the storage unit 56 stores, as the statistical value of the time difference X, an average value Xave of the time difference X between the reference time tr and the reception time ta of the target message M having been determined not to be an unauthorized message in the detection process.

The update unit 53 updates the average value Xave in the storage unit 56 by using the time difference X indicated by the time difference information in the storage unit 56. That is, the update unit 53 learns the reception cycle of the target message M by using the time difference X between the reference time tr and the reception time ta of the authorized target message M.

More specifically, when time difference information is newly stored in the storage unit 56 by the detection unit 54, the update unit 53 calculates an update value V according to formula (4) below, based on a time difference Xn indicated by the time difference information and on the average value Xave stored in the storage unit 56, and updates the average value Xave in the storage unit 56 with the calculated update value V.

[Math. 4]

$$V=(1-u)\times Xave + u \times Xn \qquad (4)$$

In the above formula, u is an attenuation coefficient and has a value not smaller than zero and not greater than 1. For example, u is set in advance according to the design transmission cycle T of the target message M.

When u is a value close to zero, the average value Xave gradually changes while the update unit 53 repeats update, and therefore, the average value Xave can be updated to a stable value while suppressing the change in the average value Xave although the time required until the average value Xave converges is increased.

On the other hand, when u is a value close to 1, the weight of the time difference Xn in the calculated update value V is increased, and therefore, a variation width, of the average value Xave, caused by fluctuation in the reception cycle of the target message M is increased although the time required until the average value Xave converges is reduced.

[Generation Unit]

As described above, upon receiving a generation request from the detection unit 54, the generation unit 55 notifies the detection unit 54 of a new reference time tr as a response to the received generation request.

(Example 1 of Generation of Reference Time)

Figure 10:
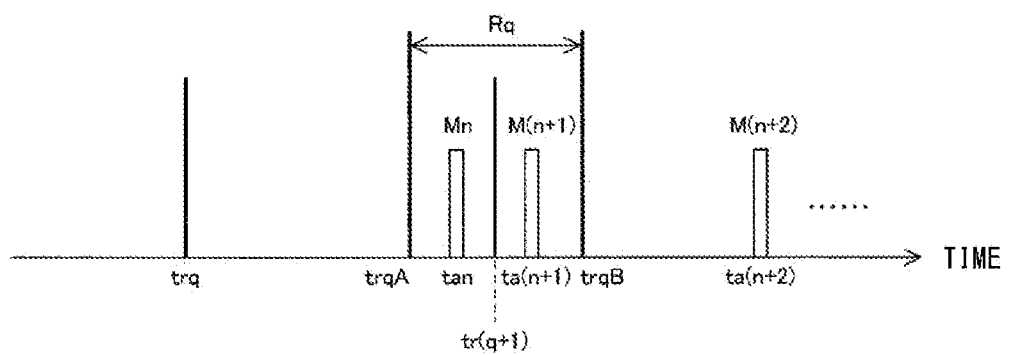
FIG. 10 shows another example of a distribution of reception times of target messages in the in-vehicle communication system according to the embodiment of the present disclosure.

FIG. 10 shows another example of a distribution of reception times of target messages in the in-vehicle communication system according to the embodiment of the present disclosure. In FIG. 10, the horizontal axis represents time.

With reference to FIG. 10, when a target message M has been determined to be abnormal in the detection process, the generation unit 55, based on a value obtained by adding the latest statistical value in the storage unit 56 to the reference time tr, generates a new reference time tr to be used in a detection process for a target message M to be transmitted after the target message M having been determined to be abnormal.

For example, upon receiving a generation request Y1 from the detection unit 54, the generation unit 55 refers to the average value Xave stored in the storage unit 56, and calculates a value by adding the latest average value Xave to the latest reference time trq. The generation unit 55 notifies the detection unit 54 of the calculated value as a new reference time tr(q+1).

Here, a reception time tap of a p-th target message Mp is expressed by formula (5) below.

[Math. 5]

$$tap = p(T+E1+E2) + \Sigma_{i=1}^{p} A_i \qquad (5)$$

E1 is an error, in a message transmission time, based on a jitter of the oscillator 131 in the control device 122. E2 is an error, in a message reception time, based on a jitter of the oscillator 143 in the gateway device 101. The errors E1, E2 are caused by manufacturing processes, usage environments, aged deteriorations, etc., of the oscillators 131, 143, respectively.

In addition, Ai is a delay time caused by a collision or a transmission wait delay, in the bus 13, of an i-th message from the control device 122.

A reference time trp to be used in the detection process for the p-th target message Mp is expressed by formula (6) below.

[Math. 6]

$$trp = (p-1) \times Xave \qquad (6)$$

The average value Xave is the reception cycle of the target message Mp, and is equal to a sum of the design transmission cycle T, the error E1, and the error E2. Therefore, a time difference Xp between the reception time tap of the target message Mp and the reference time trp is expressed by formula (7) below that is obtained by subtracting formula (6) from formula (5).

[Math. 7]

$$Xp = Xave + \Sigma_{i=1}^{p} A_i \qquad (7)$$

The delay time Ai repeats an increase and decrease according to the communication state. Therefore, the sigma term in formula (7) can be regarded as an error that does not monotonically increase but repeats an increase and decrease within a certain numerical range.

The average value Xave included in the time difference Xp between the reception time tap and the reference time trp is influenced by the errors E1, E2 caused by usage environments, aged deteriorations, etc., of the oscillators 131, 143, and therefore, the average value Xave varies depending on the usage environments and the aged deteriorations.

The generation unit 55 calculates a new reference time tr by using the average value Xave taking into consideration change in the time difference Xp according to change in the errors E1, E2.

More specifically, as described above, the generation unit 55 calculates, as a new reference time tr(q+1), a value obtained by adding, to the latest reference time trq, the latest average value Xave having been updated by the update unit 53 using the time difference X between the reception time to of the authorized target message M and the reference time tr.

(Example 2 of Generation of Reference Time)

For example, in generating a new reference time tr(q+1), the generation unit 55 uses a delay time D due to an arbitration process performed when a target message M is transmitted.

More specifically, upon receiving a generation request Y1 from the detection unit 54, the generation unit 55 refers to the average value Xave stored in the storage unit 56, and calculates a value by adding the latest average value Xave and the delay time D to the latest reference time trq. The generation unit 55 notifies the detection unit 54 of the calculated value as a new reference time tr(q+1).

For example, the storage unit 56 stores therein a delay calculation model for calculating a delay time D of a target message M from a delay time of a periodic message that is highly correlated with the target message M in regard to the transmission time.

The generation unit 55 calculates the delay time D of the target message M by using the delay calculation model in the storage unit 56 and the delay time of the periodic message, and calculates a value, as a new reference time tr(q+1), by adding the latest average value Xave and the delay time D to the latest reference time trq.

(Example 3 of Generation of Reference Time)

Figure 11:
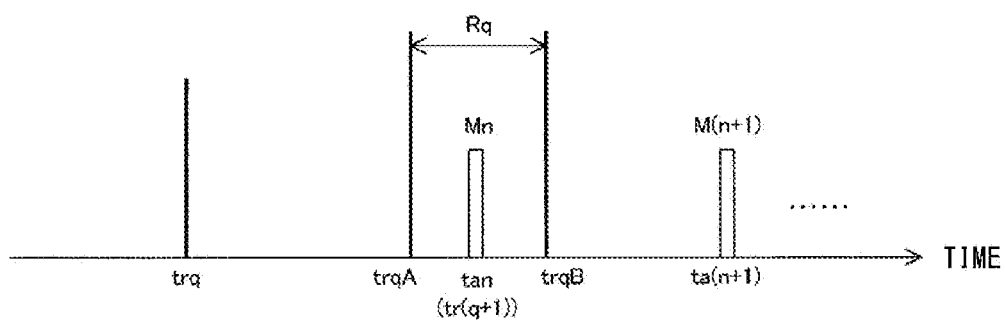
FIG. 11 shows another example of a distribution of reception times of target messages in the in-vehicle communication system according to the embodiment of the present disclosure.

FIG. 11 shows another example of a distribution of reception times of target messages in the in-vehicle communication system according to the embodiment of the present disclosure. In FIG. 11, the horizontal axis represents time.

With reference to FIG. 11, in a case where a target message M has been determined to be normal in a detection process, the generation unit 55, based on a reception time of the target message M determined to be normal, generates a new reference time tr to be used in a detection process for a target message M to be transmitted after the target message M determined to be normal.

More specifically, upon receiving a generation request Y2 from the detection unit 54, the generation unit 55 refers to the time difference information stored in the storage unit 56, and acquires a reception time tan of the latest target message Mn having been determined not to be an unauthorized message in a detection process using the latest reference time trq. The generation unit 55 notifies the detection unit 54 of the calculated reception time tan as the latest reference time tr(q+1).

(Example 4 of Generation of Reference Time)

Upon receiving the reception times ta1, ta2, ta3, ta4 of the target messages M1, M2, M3, M4 and the generation request Y3 from the detection unit 54, the generation unit 55 notifies the detection unit 54 of one of the reception times ta2, ta3 as an initial reference time tr1.

[Operation Flow]

Each of the devices in the in-vehicle communication system according to the embodiment of the present disclosure is provided with a computer including a memory. An arithmetic processing unit such as a CPU in the computer reads out a program including a part or all of steps in the flowchart and sequence diagram described below from the memory and executes the program. The programs for the plurality of devices can be installed from outside. The programs for the plurality of devices are each distributed in a state of being stored in a storage medium.

Figure 12:
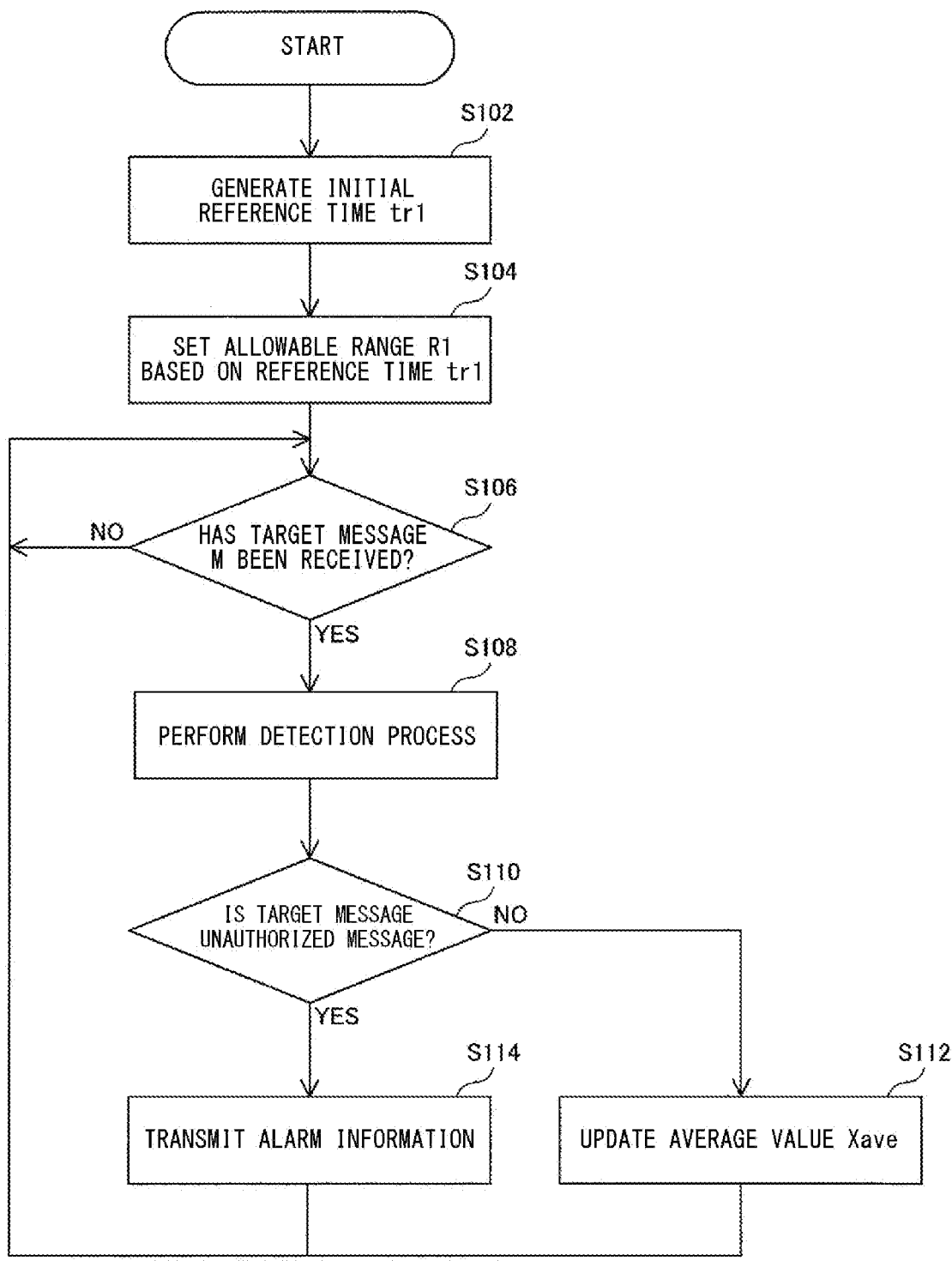
FIG. 12 shows a flowchart of an example of an operation procedure when a gateway device performs a detection process in the in-vehicle communication system according to the embodiment of the present disclosure.

FIG. 12 is a flowchart of an example of an operation procedure when the gateway device performs a detection process in the in-vehicle communication system according to the embodiment of the present disclosure.

With reference to FIG. 12, firstly, the gateway device 101 generates an initial reference time tr1 (step S102).

Next, the gateway device 101 sets a threshold allowable range R1, based on the reference time tr1 and the threshold value Th1 (step S104).

Next, the gateway device 101 monitors target messages M in the in-vehicle network 12, and waits for a target message M (NO in step S106). Upon receiving, for example, a target message Mn (YES in step S106), the gateway device 101 performs a detection process for detecting an unauthorized message. Specifically, the gateway device 101 determines whether or not the target message Mn is an unauthorized message, based on a time difference Xn between a reception time tan of the target message Mn and the reference time trq (step S108).

When the gateway device 101 has determined, as a result of the detection process, that the target message Mn is not an unauthorized message (NO in step S110), the gateway device 101 updates the average value Xave stored in the storage unit 56 by using the time difference Xn between the reception time tan of the target message Mn and the reference time trq (step S112).

The gateway device 101 continues monitoring target messages M, and waits for a next target message M(n+1) (NO in step S106).

When the gateway device 101 has determined, as the result of the detection process, that the target message Mn is an unauthorized message (YES in step S110), the gateway device 101 transmits, to a higher-order device inside or outside the vehicle 1, alarm information indicating that an unauthorized message is being transmitted (step S114).

The gateway device 101 continues monitoring target messages M, and waits for a next target message M(n+1) (NO in step S106).

Figure 13:
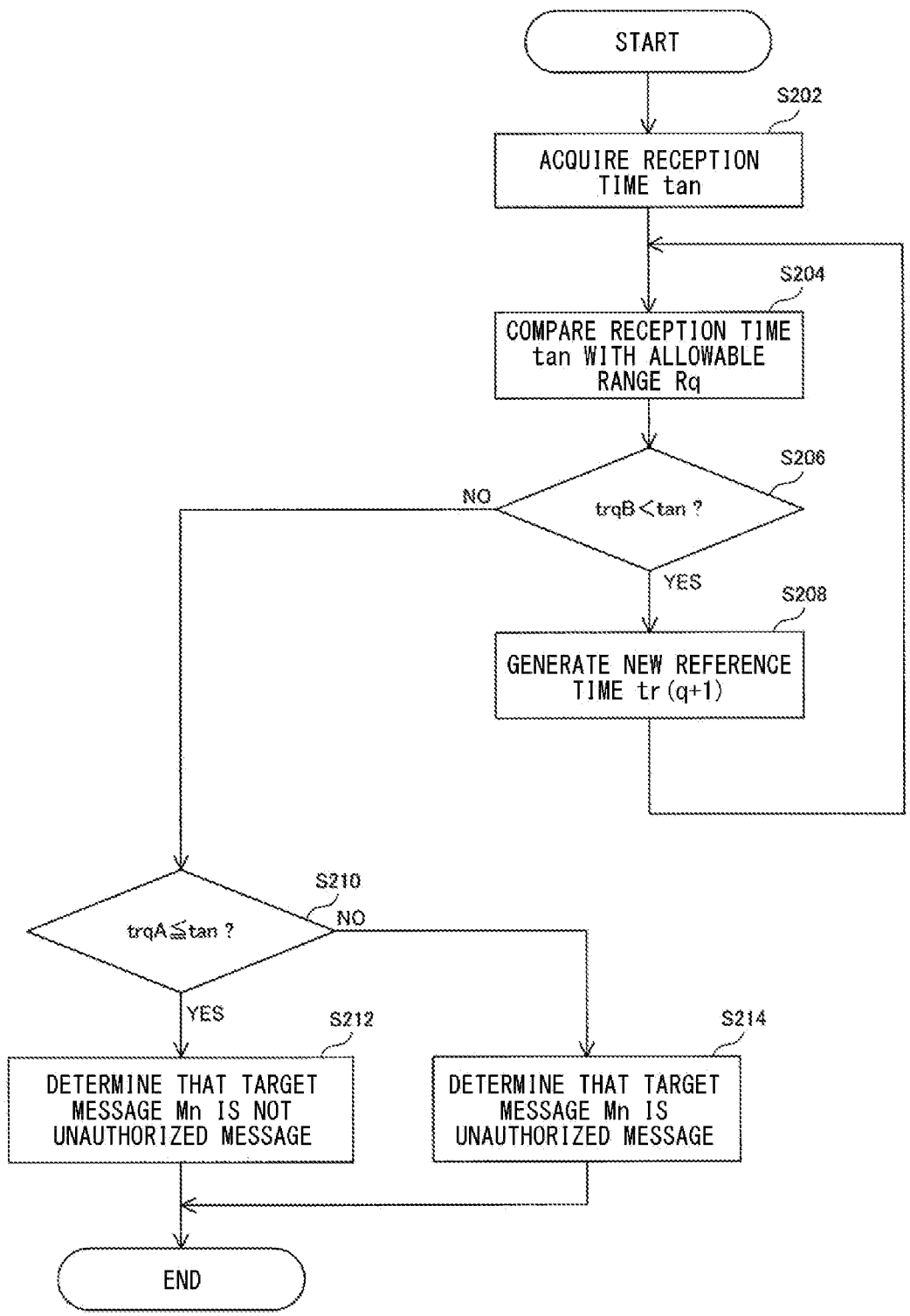
FIG. 13 is a flowchart of an example of a detection process in the gateway device of the in-vehicle communication system according to the embodiment of the present disclosure.

FIG. 13 is a flowchart of an example of a detection process in the gateway device of the in-vehicle communication system according to the embodiment of the present disclosure. FIG. 13 shows step S108 in FIG. 12 in more detail.

With reference to FIG. 13, firstly, the gateway device 101 acquires a reception time tan of a target message Mn (step S202).

Next, the gateway device 101 compares the acquired reception time tan with an allowable range Rq, i.e., threshold times trqA, trqB, which is set based on the latest reference time trq (step S204).

When the reception time tan is a time after the threshold time trqB (YES in step S206), the gateway device 101 generates a new reference time tr(q+1) (step S208), and compares the reception time tan with an allowable range R(q+1) based on the newly generated reference time tr(q+1) (step S204).

When the reception time tan is within the allowable range Rq (NO in step S206, and YES in step S210), the gateway device 101 determines that the target message Mn is not an unauthorized message (step S212).

When the reception time tan is a time before the threshold time trqA (NO in step S206, and NO in step S210), the gateway device 101 determines that the target message Mn is an unauthorized message (step S214).

Figure 14:
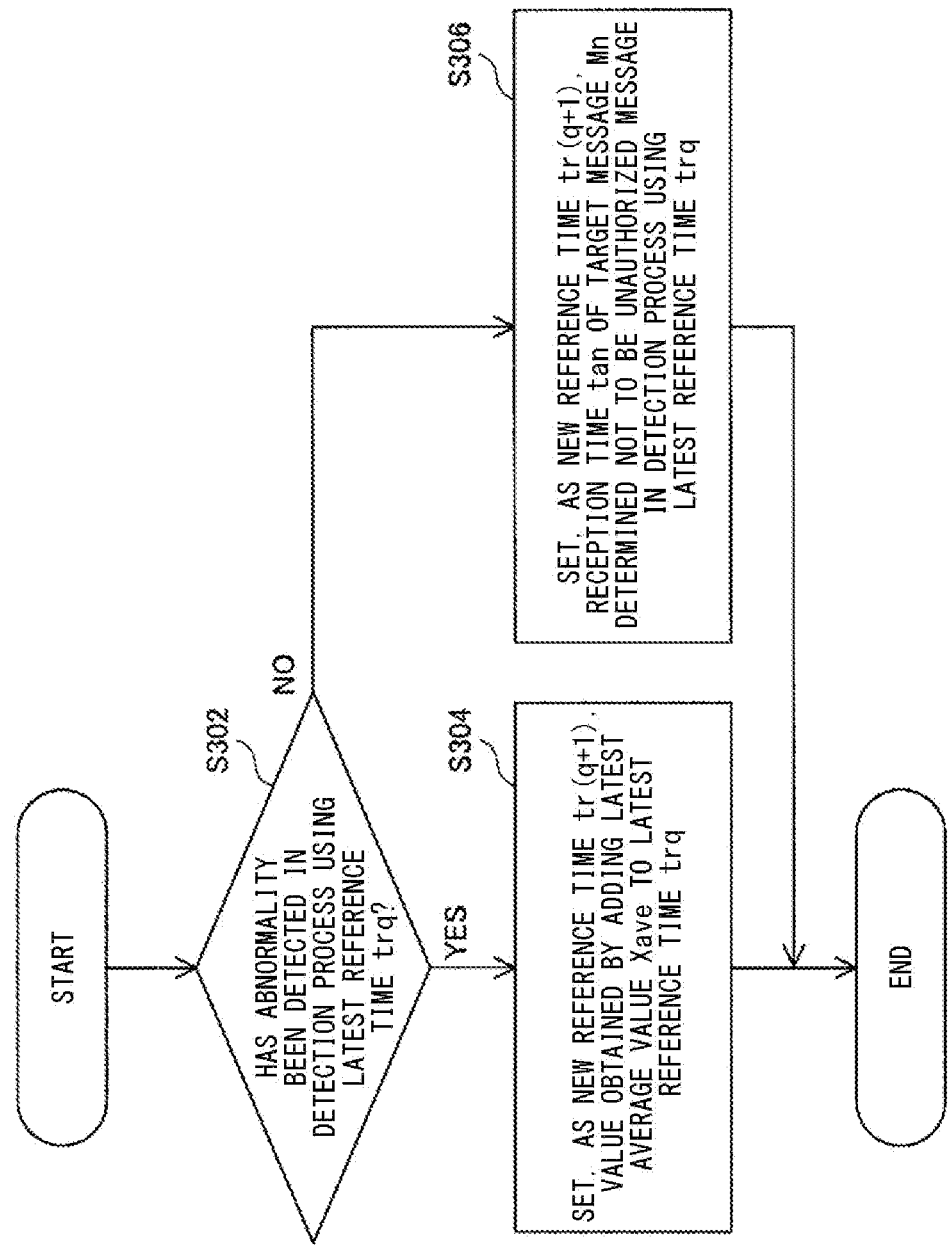
FIG. 14 is a flowchart of an example of a process of generating a reference time in the gateway device of the in-vehicle communication system according to the embodiment of the present disclosure.

FIG. 14 is a flowchart of an example of a process of generating a reference time in the gateway device of the in-vehicle communication system according to the embodiment of the present disclosure. FIG. 14 shows step S208 in FIG. 13 in more detail.

With reference to FIG. 14, firstly, when the gateway device 101 has detected an abnormality in the detection process using the latest reference time trq, specifically, when the gateway device 101 has detected an unauthorized message or has made gray decision (YES in step S302), the gateway device 101 sets, as a new reference time tr(q+1), a value obtained by adding the latest average value Xave to the latest reference time trq (step S304).

On the other hand, when the gateway device 101 has not detected an abnormality in the detection process using the latest reference time trq, specifically, when the gateway device 101 has not detected an unauthorized message and has not made gray decision (NO in step S302), the gateway device 101 sets, as a new reference time tr(q+1), a reception time tan of a target message Mn having been determined not to be an unauthorized message in the detection process using the latest reference time trq (step S306).

Figure 15:
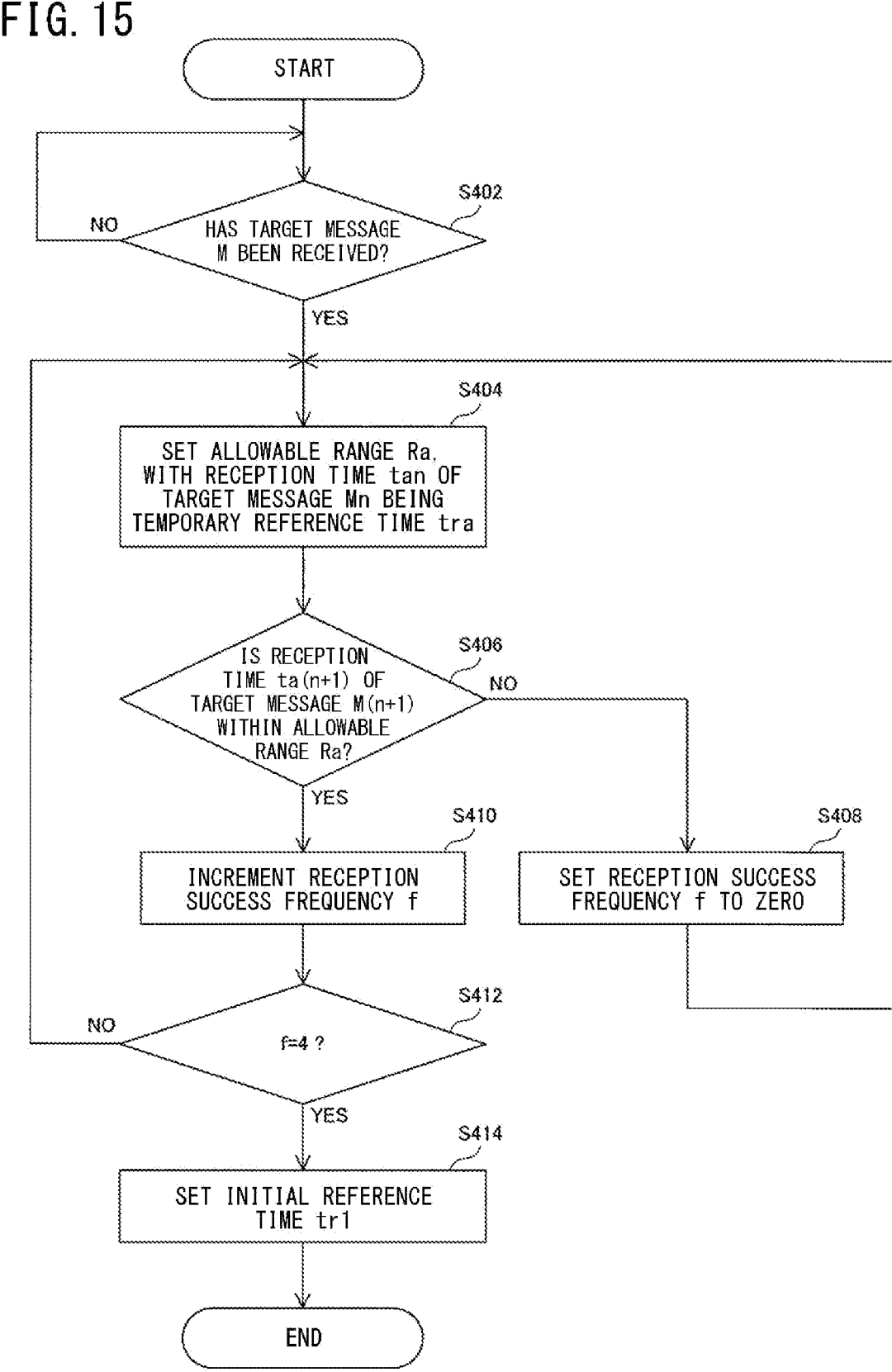
FIG. 15 is a flowchart of an example of a process of generating an initial reference time in the gateway device of the in-vehicle communication system according to the embodiment of the present disclosure.

FIG. 15 is a flowchart of an example of a process of generating an initial reference time in the gateway device of the in-vehicle communication system according to the embodiment of the present disclosure. FIG. 15 shows step S102 in FIG. 12 in more detail.

With reference to FIG. 15, firstly, the gateway device 101 waits for a target message M (NO in step S402). Upon receiving, for example, a target message Mn (YES in step S402), the gateway device 101 sets an allowable range Ra by using a reception time tan of the target message Mn as a temporary reference time tra (step S404).

When a reception time ta(n+1) of a next target message M(n+1) is outside the allowable range Ra (NO in step S406), the gateway device 101 sets a reception success frequency f to zero (step S408), and sets an allowable range Ra by using the reception time ta(n+1) as a temporary reference time tra (step S404).

On the other hand, when the reception time ta(n+1) of the next target message M(n+1) is within the allowable range Ra (YES in step S406), the gateway device 101 increments the reception success frequency f (step S410).

When the reception success frequency f is less than 4 (NO in step S412), the gateway device 101 sets an allowable range Ra by using the reception time ta(n+1) as a temporary reference time tra (step S404).

When the reception success frequency f has become 4 (YES in step S412), the gateway device 101 sets, for example, a reception time ta(n+2) as an initial reference time tr1, out of reception times tan, ta(n+1), ta(n+2), ta(n+3) of 4 continuous target messages Mn, M(n+1), M(n+2), M(n+3) (step S414).

In the in-vehicle communication system 301 according to the embodiment of the present disclosure, the gateway device 101 is configured to detect an unauthorized message in the in-vehicle network 12. However, the present disclosure is not limited thereto. In the in-vehicle communication system 301, a detection device different from the gateway device 101 may be configured to detect an unauthorized message in the in-vehicle network 12.

In the in-vehicle communication system 301 according to the embodiment of the present disclosure, the gateway device 101 that functions as a detection device is directly connected to the bus 13. However, the present disclosure is not limited thereto.

Figure 16:
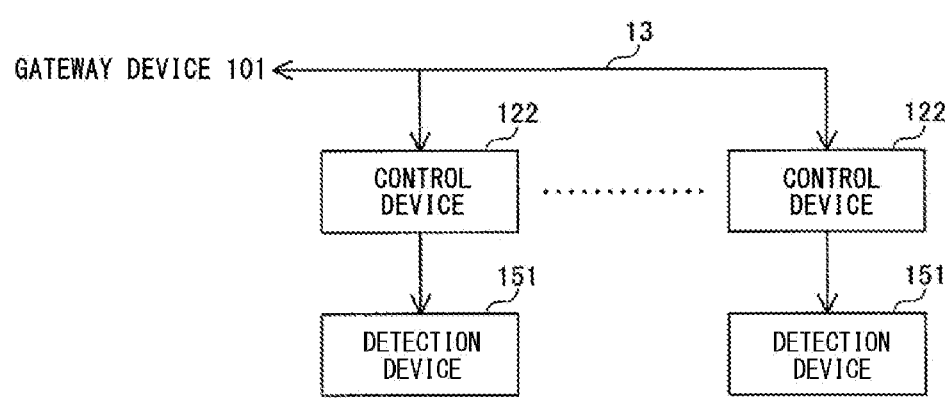
FIG. 16 shows an example of a connection topology of an in-vehicle network according to the embodiment of the present disclosure.

FIG. 16 shows an example of a connection topology of an in-vehicle network according to the embodiment of the present disclosure.

With reference to FIG. 16, a detection device 151 may be connected to a bus 13 via an in-vehicle device, e.g., a control device 122. In this case, for example, the detection device 151 detects an unauthorized message transmitted to the bus 13, by monitoring messages transmitted/received by the in-vehicle device.

In the example shown in FIG. 16, for example, the monitoring unit 52 of the detection device 151 acquires a time corresponding to a transmission time of a target message M transmitted by the control device 122. The detection unit 54 of the detection device 151 performs a detection process, based on a time difference between the transmission time of the target message M based on a monitoring result of the monitoring unit 52, and the reference time tr generated by the generation unit 55. The update unit 53 of the detection device 151 updates a statistical value of the time difference by using a time difference between the reference time tr and the transmission time of the target message M having been determined to be normal in the detection process.

In the gateway device 101 according to the embodiment of the present disclosure, as the detection process, the detection unit 54 determines whether or not a target message M is an unauthorized message. However, the present disclosure is not limited thereto. As the detection process, the detection unit 54 may calculate a probability of a target message M being an unauthorized message.

In the gateway device 101 according to the embodiment of the present disclosure, in the case where the detection unit 54 has determined that a target message Mn is not an unauthorized message and thereafter has further determined that a target message M(n+1) is not an unauthorized message, the detection unit 54 makes gray decision on the target messages Mn, M(n+1). However, the present disclosure is not limited thereto. The detection unit 54 may not necessarily make gray decision.

In the gateway device 101 according to the embodiment of the present disclosure, when the detection unit 54 has not detected an unauthorized message and has not made gray decision in the detection process using the reference time trq, the detection unit 54 notifies the generation unit 55 of a generation request Y2. However, the present disclosure is not limited thereto. When the detection unit 54 has not detected an unauthorized message and has not made gray decision in the detection process using the reference time trq, the detection unit 54 may notify the generation unit 55 of the generation request Y1 without notifying the generation unit 55 of the generation request Y2.

In this case, as described above, the generation unit 55 refers to the average value Xave in the storage unit 56, and calculates a value by adding the latest average value Xave to the latest reference time trq. The generation unit 55 notifies the detection unit 54 of the calculated value as a new reference time tr(q+1).

Incidentally, a technology enabling more accurate detection of an unauthorized message in an in-vehicle network has been desired.

For example, a method for detecting an unauthorized message impersonating an authorized periodic message while monitoring periodic messages is conceivable. In this method, such an unauthorized message is detected, with a periodic message transmitted at a certain time being a reference, based on a time difference between the transmission time of the periodic message and a transmission time of a periodic message transmitted next.

In this method, however, if the periodic message serving as the reference is an unauthorized message, whether or not the periodic message transmitted next is an unauthorized message cannot be accurately determined in some cases.

Specifically, in the above method in which whether or not a next periodic message is an unauthorized message is determined based on the transmission time of an immediately preceding periodic message, if an immediately preceding periodic message is an unauthorized message, determination as to whether or not a next periodic message is an unauthorized message will be performed based on the transmission time of the unauthorized message. This may result in that a next unauthorized message is erroneously determined as an authorized message, or that an authorized message transmitted according to a predetermined design transmission cycle is erroneously determined as an unauthorized message.

In contrast to the above method, in the gateway device 101 according to the embodiment of the present disclosure, the monitoring unit 52 monitors, as target messages M, an authorized message being periodically transmitted and an unauthorized message in the in-vehicle network 12. The detection unit 54 performs a detection process of detecting an unauthorized message. The generation unit 55 generates a reference time tr to be used in the detection process. The detection unit 54 performs the detection process, based on a time difference Xn between a time corresponding to a transmission time of a target message Mn based on a monitoring result of the monitoring unit 52, and a reference time trq generated by the generation unit 55. The update unit 53 updates an average value Xave of a time difference X by using the time difference X between the reference time tr and a time corresponding to a transmission time of a target message M having been determined to be normal in the detection process. When the target message Mn has been determined to be abnormal in the detection process, the generation unit 55, based on a value obtained by adding the latest average value Xave to the reference time trq, generates a new reference time tr(q+1) to be used in the detection process for a target message M(n+1) to be transmitted after the target message Mn determined to be abnormal.

As described above, the average value Xave is updated by using the time difference X between the reference time tr and the time corresponding to the transmission time of the target message M having been determined to be normal in the detection process, and when the target message Mn has been determined to be abnormal in the detection process, the new reference time tr(q+1) is generated based on the value obtained by adding the average value Xave of the time difference X to the reference time trq. In this configuration, since the detection process is prevented from being performed based on a time corresponding to a transmission time of an unauthorized message, it is possible to inhibit erroneous detection in the detection process for the target message M(n+1) to be transmitted next to the target message Mn determined to be abnormal.

Therefore, in the gateway device 101 according to the embodiment of the present disclosure, it is possible to more accurately detect an unauthorized message in the in-vehicle network.

In the gateway device 101 according to the embodiment of the present disclosure, the detection unit 54 detects an abnormality regarding a target message Mn, based on a time difference Xn between the reference time trq and a time corresponding to a transmission time of a target message Mn, and on a time difference X(n+1) between the reference time trq and a time corresponding to a transmission time of a target message M(n+1) to be transmitted after the target message Mn.

In the above configuration, for example, in the detection process using the reference time trq, even in a case where a plurality of target messages M are transmitted within a time period in which the target messages M are determined to be normal and an unauthorized message included in the plurality of target messages M is erroneously determined to be an authorized message, it is possible to determine that there is a possibility that the plurality of target messages M are abnormal. Thus, for example, gray decision can be made on the unauthorized message that could not be detected in the detection process.

In the gateway device 101 according to the embodiment of the present disclosure, when a target message Mn has been determined to be normal in the detection process, the generation unit 55, based on a time corresponding to the transmission time of the target message Mn determined to be normal, generates a new reference time tr(q+1) to be used in the detection process for a target message M(n+1) to be transmitted after the target message Mn determined to be normal.

In the above configuration, for example, a time corresponding to an actual transmission time of the target message Mn having been determined to be normal is set as a new reference time tr(q+1). Thus, it is possible to perform a more accurate detection process taking into consideration a change, in the transmission time of the target message Mn, caused by a communication delay or the like.

In the gateway device 101 according to the embodiment of the present disclosure, the generation unit 55, when generating the reference time tr, uses a delay time due to an arbitration process performed when a target message M is transmitted.

In the above configuration, for example, when the new reference time tr(q+1) is generated by adding the latest average value Xave of the time difference X to the reference time trq, a more accurate detection process can be performed by using the reference time tr(q+1) taking into consideration a change, in the transmission time of the target message Mn, caused by a communication delay or the like.

The vehicle 1 according to the embodiment of the present disclosure is provided with the gateway device 101.

In the above configuration, in the vehicle 1 provided with the gateway device 101, an unauthorized message in the in-vehicle network 12 can be more accurately detected.

A detection method according to the embodiment of the present disclosure is a detection method used by the gateway device 101 that detects an unauthorized message in the in-vehicle network 12. In this detection method, firstly, the gateway device 101 monitors, as target messages M, an authorized message being periodically transmitted and an unauthorized message in the in-vehicle network 12. Next, the gateway device 101 generates a reference time tr to be used in a detection process of detecting an unauthorized message. Next, the gateway device 101 performs the detection process, based on a time difference Xn between a time corresponding to a transmission time of a target message Mn based on a monitoring result of the target message M, and a generated reference time trq. Next, the gateway device 101 updates an average value Xave of a time difference X by using the time difference X between the reference time tr and a time corresponding to a transmission time of a target message M having been determined to be normal in the detection process. In the step of generating the reference time tr, when the target message Mn has been determined to be abnormal in the detection process, the gateway device 101, based on a value obtained by adding the latest average value Xave to the reference time trq, generates a new reference time tr(q+1) to be used in the detection process for a target message M(n+1) to be transmitted after the target message Mn determined to be abnormal.

As described above, the average value Xave is updated by using the time difference X between the reference time tr and the time corresponding to the transmission time of the target message M having been determined to be normal in the detection process, and when the target message Mn has been determined to be abnormal in the detection process, the new reference time tr(q+1) is generated based on the value obtained by adding the average value Xave of the time difference X to the reference time trq. Thus, the detection process is prevented from being performed based on a time corresponding to a transmission time of an unauthorized message. Therefore, it is possible to inhibit erroneous detection in the detection process for the target message M(n+1) to be transmitted next to the target message Mn determined to be abnormal.

Therefore, in the detection method according to the embodiment of the present disclosure, it is possible to more accurately detect an unauthorized message in the in-vehicle network.

The above embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A detection device configured to detect an unauthorized message in an in-vehicle network, comprising:

a monitoring unit configured to monitor, as target messages, an authorized message being periodically transmitted and the unauthorized message in the in-vehicle network;

a generation unit configured to generate a reference time to be used in a detection process of detecting the unauthorized message;

a detection unit configured to perform the detection process, based on a time difference between a time corresponding to a transmission time of the target message based on a monitoring result of the monitoring unit, and the reference time generated by the generation unit; and an update unit configured to update a statistical value of the time difference by using the time difference between the reference time and a time corresponding to a transmission time of the target message having been determined to be normal in the detection process, wherein when the target message has been determined to be abnormal in the detection process, the generation unit, based on a value obtained by adding a latest statistical value to the reference time, generates a new reference time to be used in the detection process for a target message to be transmitted after the target message determined to be abnormal, when the target message has been determined to be normal in the detection process, the generation unit generates, based on a transmission time of the target message having been determined to be normal, a new reference time to be used in the detection process for a target message to be transmitted after the target message having been determined to be normal, and the statistical value of the time difference is an average value of the time difference.

[Additional Note 2]

A detection device configured to detect an unauthorized message in an in-vehicle network, comprising:

a monitoring unit configured to monitor, as target messages, an authorized message being periodically transmitted and the unauthorized message in the in-vehicle network;

a generation unit configured to generate a reference time to be used in a detection process of detecting the unauthorized message;

a detection unit configured to perform the detection process, based on a time difference between a time corresponding to a transmission time of the target message based on a monitoring result of the monitoring unit, and the reference time generated by the generation unit; and an update unit configured to update a statistical value of the time difference by using the time difference between the reference time and a time corresponding to the transmission time of the target message having been determined to be normal in the detection process, wherein when the target message has been determined to be abnormal in the detection process, the generation unit generates, based on a value obtained by adding a latest statistical value to the reference time, a new reference time to be used in the detection process for a target message to be transmitted after the target message having been determined to be abnormal, and the monitoring unit, the generation unit, the detection unit, and the update unit are each implemented by a processor.

REFERENCE SIGNS LIST 1 vehicle
12 in-vehicle network
13, 14 bus
51 communication processing unit
52 monitoring unit
53 update unit
54 detection unit
55 generation unit
56 storage unit
101 gateway device
111 in-vehicle communication device
112 port
121 bus connection device group
122 control device
131 oscillator
132 CPU
133 CAN transceiver
141 CPU 142 CAN transceiver
143 oscillator
151 detection device
301 in-vehicle communication system

The invention claimed is:

1. A detection device configured to detect an unauthorized message in an in-vehicle network, comprising:
   a monitoring unit configured to monitor, as target messages, an authorized message being periodically transmitted and the unauthorized message in the in-vehicle network;
   a generation unit configured to generate a reference time to be used in a detection process of detecting the unauthorized message;
   a detection unit configured to perform the detection process, based on a time difference between a time corresponding to a transmission time of the target message based on a monitoring result of the monitoring unit, and the reference time generated by the generation unit; and
   an update unit configured to update a statistical value of the time difference by using the time difference between the reference time and a time corresponding to a transmission time of the target message having been determined to be normal in the detection process, wherein
   when the target message has been determined to be abnormal in the detection process, the generation unit, based on a value obtained by adding a latest statistical value to the reference time, generates a new reference time to be used in the detection process for a target message to be transmitted after the target message having been determined to be abnormal.

2. The detection device according to claim 1, wherein
the detection unit detects an abnormality regarding a first target message, based on a time difference between the reference time and a time corresponding to a transmission time of the first target message that is the target message, and on a time difference between the reference time and a time corresponding to a transmission time of a second target message that is the target message to be transmitted after the first target message.

3. The detection device according to claim 1, wherein
when the target message has been determined to be normal in the detection process, the generation unit, based on a time corresponding to a transmission time of the target message having been determined to be normal, generates a new reference time to be used in the detection process for a target message to be transmitted after the target message having been determined to be normal.

4. The detection device according to claim 1, wherein
the generation unit, when generating the reference time, uses a delay time due to an arbitration process performed when the target message is transmitted.

5. A vehicle being provided with the detection device according to claim 1.

6. A detection method performed in a detection device configured to detect an unauthorized message in an in-vehicle network, the method comprising:
   monitoring, as target messages, an authorized message being periodically transmitted and the unauthorized message in the in-vehicle network;
   generating a reference time to be used in a detection process of detecting the unauthorized message;
   performing the detection process, based on a time difference between a time corresponding to a transmission time of the target message based on a monitoring result of the target message, and the generated reference time; and
   updating a statistical value of the time difference by using the time difference between the reference time and a time corresponding to a transmission time of the target message having been determined to be normal in the detection process, wherein
   in generating the reference time, when the target message has been determined to be abnormal in the detection process, a new reference time to be used in the detection process for a target message to be transmitted after the target message having been determined to be abnormal, is generated based on a value obtained by adding a latest statistical value to the reference time.

7. A computer-readable non-transitory storage having stored therein a detection program used in a detection device configured to detect an unauthorized message in an in-vehicle network, the program causing a computer to function as:
   a monitoring unit configured to monitor, as target messages, an authorized message being periodically transmitted and the unauthorized message in the in-vehicle network;
   a generation unit configured to generate a reference time to be used in a detection process of detecting the unauthorized message;
   a detection unit configured to perform the detection process, based on a time difference between a time corresponding to a transmission time of the target message based on a monitoring result of the monitoring unit, and the reference time generated by the generation unit; and
   an update unit configured to update a statistical value of the time difference by using the time difference between the reference time and a time corresponding to a transmission time of the target message having been determined to be normal in the detection process, wherein
   when the target message has been determined to be abnormal in the detection process, the generation unit, based on a value obtained by adding a latest statistical value to the reference time, generates a new reference time to be used in the detection process for a target message to be transmitted after the target message having been determined to be abnormal.

* * * * *